United States Patent
Choi et al.

(10) Patent No.: US 8,940,655 B2
(45) Date of Patent: Jan. 27, 2015

(54) POROUS OXIDE MICROPARTICLES AND COMPOSITES THEREOF AND METHODS OF MAKING AND USING SAME

(71) Applicant: University of Maryland, College Park, College Park, MD (US)

(72) Inventors: Kyu Yong Choi, Rockville, MD (US); Carla Luciani, College Park, MD (US); Laleh Emdadi, Clarksburg, MD (US); Sang Yool Lee, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 13/771,568

(22) Filed: Feb. 20, 2013

(65) Prior Publication Data

US 2013/0267408 A1 Oct. 10, 2013

Related U.S. Application Data

(60) Provisional application No. 61/600,899, filed on Feb. 20, 2012.

(51) Int. Cl.
  *C08F 10/00* (2006.01)
  *C08F 4/659* (2006.01)
  *C08F 4/6592* (2006.01)

(52) U.S. Cl.
  CPC ............ *C08F 10/00* (2013.01); *C08F 4/65912* (2013.01); *C08F 4/65927* (2013.01)
  USPC .......................................... 502/152; 502/232

(58) Field of Classification Search
  None
  See application file for complete search history.

(56) References Cited

U.S. PATENT DOCUMENTS 7,563,457 B2 * 7/2009 Cha et al. .................... 424/491

OTHER PUBLICATIONS

Polymer particles with a pomegranate-like internal structure via micro-dispersive polymerization in a geometrically confined reaction space I. Experimental study Carla V. Luciani et al. Polymer, vol. 52, pp. 942-948, 2011.*
An effective approach to synthesis of poly(methyl methacrylate)/silica nanocomposites Xuefeng Ding et al. Nanotechnology, vol. 17, pp. 4796-4801, 2006.*

* cited by examiner

*Primary Examiner* — Melvin C Mayes
*Assistant Examiner* — Douglas Call
(74) *Attorney, Agent, or Firm* — Hodgson Russ LLP

(57) ABSTRACT

Provided are substantially spherical, porous oxide microparticles having a plurality of substantially spherical voids, substantially spherical, porous oxide-organic polymer composite microparticles having a plurality of substantially spherical organic polymer domains. The microparticles can be made using a microdispersive suspension polymerization step to make microparticles having an organic polymer shell and a plurality of discrete substantially spherical organic nanoparticles. The microparticles can be used as polymerization catalyst supports.

11 Claims, 17 Drawing Sheets

US 8,940,655 B2

POROUS OXIDE MICROPARTICLES AND COMPOSITES THEREOF AND METHODS OF MAKING AND USING SAME

CROSS-REFERENCE TO RELATED APPLICATIONS

This application claims priority to U.S. provisional patent application No. 61/600,899, filed Feb. 20, 2012, the disclosure of which is incorporated herein by reference.

FIELD OF THE INVENTION

The field of the invention generally relates to porous oxide microparticles having a plurality of substantially spherical voids and oxide-organic polymer composite microparticles having a plurality of substantially spherical organic polymer domains and methods of making and using such microparticles.

BACKGROUND OF THE INVENTION

Three-dimensionally ordered macroporous materials or inverse opals are inverse replicates of opals consisting of regularly arranged and uniformly sized spherical void spaces of a few hundred nanometers in diameter surrounded by thin solid walls. High porosity inverse opals of various chemical nature such as silica, titania, metal oxides, metals, and semiconductor materials have been shown to be potentially useful in a variety of applications.

Recently, various synthetic techniques for inverse opals have been reviewed in detail. One of the most commonly used methods to prepare inorganic inverse opals (e.g., $SiO_2$ or $TiO_2$) is the colloidal crystal templating (CCT) where hexagonally packed or patterned layers of monodisperse or binary colloidal particles are used as sacrificial templates.

Techniques reported in the literature for silica inverse opal synthesis have been limited to preparing three-dimensional "layered" structures and there is no report on the preparation of inverse silica opals or the like having three-dimensional spherical geometry. This is so because it is has not been possible to make such silica inverse opals using the layer deposit techniques with latex particles of a few hundred nanometers.

Porous silica particles with large surface areas are widely used in the polyolefin industry to support high activity chromium oxide catalysts for high-density polyethylene or metallocene catalysts for α-olefin polymerization in liquid slurry or gas phase polymerization processes. The performance of olefin polymerization catalysts represented by high catalyst activity and the controllability of particle morphology and polymer properties is critical for the competitiveness of industrial polymerization processes. The effectiveness of heterogeneous olefin polymerization catalysts depends on factors such as chemical composition and structure of a catalyst itself, chemical and physical properties of a support material, and supported catalyst formulation procedure.

One of the intriguing issues concerning silica-supported metallocene catalysts in olefin polymerization is the role of a silica support that is the most widely employed support material. For example, the properties of a silica particle surface influence the formation of various types of active sites of different catalytic activity when active metallocene compounds are immobilized with or without methylaluminoxane (MAO). The morphology and physical properties of silica can also affect the performance of a silica-supported metallocene catalyst. Commercially available silica gel is comprised of randomly linked spherical polymerized primary particles that grow to sizes over 4-5 nm before they coagulate to form the aggregated clusters. The properties of silica gels are influenced by the size and state of aggregation of the primary particles and their surface chemistry. Typical silica particles have surface area of 250-300 $m^2/g$ and pore size of around 20-30 nm. Porous silica-supported metallocene catalysts usually undergo complex particle fragmentation and growth process as polymerization progresses.

It is generally believed that the initial particle fragmentation affects the catalyst activity as well as the final morphology of a polymer particle. Often, irregular or incomplete fragmentation of silica occurs and a large fraction of catalyst sites are buried in the solid phase and unavailable for the polymerization. Thus, overall polymerization activity of the silica-supported catalysts is strongly dependent on the effectiveness of particle fragmentation. For the homogeneous fragmentation of the silica support, it is required that active catalytic sites are distributed uniformly on the support surface within micro-pores and that pore size and structure are optimally designed. The catalyst activity data reported in the literature by different authors are often inconsistent even for a chemically identical metallocene catalyst. The reported catalyst activity values are mostly time-averaged (i.e., yield/reaction time) and such data do not represent the true catalytic behavior because the polymerization rate or catalyst activity is strongly dependent on reaction time. It is thought that such discrepancies might be also due to the variations in the actual amount of active transition metal deposited on a support material as well as particle disintegration patterns that affect the availability of the catalyst sites for polymerization.

BRIEF SUMMARY OF THE INVENTION

In an aspect, the present invention provides a substantially spherical, porous oxide microparticle, the microparticles comprising a plurality of discrete substantially spherical voids. The bulk oxide of the microparticle is silicon oxide, titanium oxide, zirconium oxide, or combinations thereof and the bulk oxide is porous.

In an embodiment, the substantially spherical, porous oxide microparticle comprises a catalyst (e.g., an olefin polymerization catalyst) covalently bonded to at least a portion of a surface of the microparticle, and, optionally, a co-catalyst covalently bonded to at least a portion of a surface of the microparticle.

In another aspect, provided is a substantially spherical, porous oxide-organic polymer composite microparticle, the microparticle comprising a polymer shell, and a plurality of discrete substantially spherical organic polymer domains disposed in porous oxide, where the porous oxide is silicon oxide, titanium oxide, zirconium oxide, or a combination thereof. Substantially spherical, porous oxide-organic polymer composite microparticles can be obtained by contacting a substantially spherical, porous oxide-organic polymer composite microparticle with an acid catalyst such that the alkoxy oxide precursor is hydrolyzed to form an oxide in the interstitial spaces in the composite microparticles.

In yet another aspect, provided are methods for making a plurality of substantially spherical, oxide-organic polymer composite microparticles having a plurality of discrete substantially spherical domains of organic polymer disposed in an oxide and an organic polymer shell. The oxide can be silicon oxide, titanium oxide, zirconium oxide, or a combination thereof.

In still another aspect, provided are polymerization methods where microparticles described herein are used as catalysts. In embodiment, the method is an olefin polymerization. It was surprisingly found that the initial catalytic activity of the oxide microparticle catalysts was increased 16 times and a polymer yield was increased 4 times compared to conventional and commercial silica particles.

DETAILED DESCRIPTION OF THE INVENTION

Figure 1:
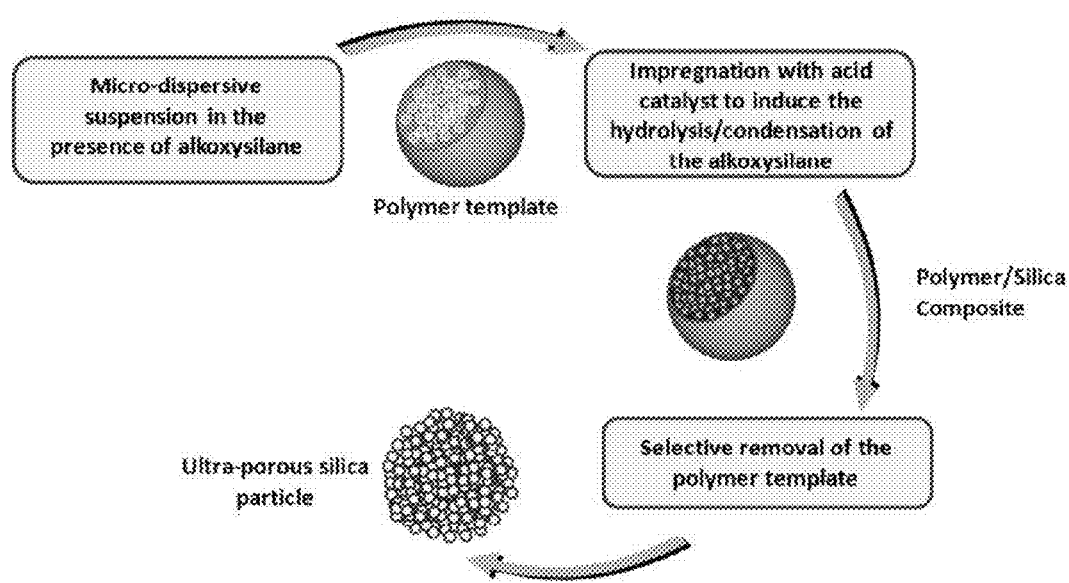
FIG. 1. An example of a schematic representation of the process proposed in this invention.

The present invention provides substantially spherical, porous oxide microparticles having a plurality of substantially spherical voids. The microparticles can have a pseudo-inverse opal-like structure. Also provided are substantially spherical, porous oxide-organic polymer composite microparticles having a plurality of substantially spherical organic polymer domains. Methods of making and using the microparticles are also provided.

The microparticles of the present invention are referred to herein as pseudo inverse opal of silica (PIOS) particles. A unique identity of the PIOS particles is that it is a substantially spherical microparticle and not a layered structure.

As used herein, "substantially spherical" means the sphericity (the ratio of the surface area of a perfect sphere having a diameter (x) to a microparticle or a nanoparticle having a longest linear dimension (y) (e.g., diameter)) is 0.9 or greater. In various embodiments, the sphericity of a microparticle or a nanoparticle is 0.95 or greater, 0.96 or greater, 0.97 or greater, 0.98 or greater, or 0.99 or greater. In various embodiments, the sphericity of a microparticle or nanoparticle is 1 (i.e., the particle is perfectly spherical). A microparticle or a nanoparticle can have more than one longest linear dimension. For example, a perfect sphere has an infinite number of diameters that are each a longest linear dimension. The organic polymer microparticles comprising a plurality of organic polymer nanoparticles are substantially spherical as they are made by a microdispersive suspension polymerization and are derived from spherical liquid droplets suspended in an aqueous medium by mechanical agitation. Without intending to be bound by any particular theory, it is considered that the microparticles or nanoparticles have a spherical geometry, but the spherical shape can be slightly deformed during the formation process, e.g., by the collision of particles or by the removal of organic liquid as particles are dried after the synthesis process.

Opals are iridescent gems that nature makes packing silica nano-spheres in regular microstructures. Their inverse replicas (i.e., regular arrangements of void spaces surrounded by solid silica walls) are called "inverse opals." Inverse opals are obtained by filling the voids of the opal structure with materials of high refractive index and then removing the original opal materials. Thus, inverse opals consist of a regular arrangement of spherical void spaces surrounded by solid walls rather than a regular arrangement of uniform spherical particles. The microparticle morphology is similar to a pomegranate and can be referred to as "pomegranate-like particles."

In an aspect, the present invention provides a substantially spherical, porous oxide microparticle. The microparticle has a plurality of substantially spherical voids (also referred to herein as circular pores) in a porous oxide phase. The oxide phase can be referred to as a bulk oxide phase.

The oxide phase occupies the interstitial spaces (i.e., non-void space in the microparticle) and can be a variety of oxides. For example, the oxide phase can be silicon oxide (i.e., silica), titanium oxide (i.e., titania), zirconium oxide (i.e., zirconia), or a combination thereof.

The porous oxide microparticles can have a broad range of sizes, e.g., from 1 micron to 2 millimeters, including all values to the micron and ranges therebetween. In an embodiment, the microparticles can have size of 5 to 350 microns, including all values to the micron and ranges therebetween. The microparticle size is measured as the longest linear dimension, e.g., the diameter, of the particle. The size of the microparticles is related to the droplet size of the microdispersive suspension polymerization used to make the organic polymer microparticles. A variety of organic polymer microparticle sizes can be realized depending upon the agitation speed, vessel size, agitator geometry, pH of aqueous solution, suspension stabilizer type and concentrations, the selection of which is within the purview of one having skill in the art.

The porous oxide microparticles have substantially spherical voids that can have a broad range of sizes. The voids can result from the removal of the organic polymer phase (the organic polymer phase being derived from the template organic polymer nanoparticles in the organic polymer microparticles) in an oxide-organic polymer microparticle by, for example, by calcination or dissolution. The plurality of voids provides an oxide microparticle having a desirable surface area and a desirable pore size and structure. The voids can be discrete, an agglomerate of voids, or a combination thereof. The microparticles can have a plurality of substantially spherical voids having a size of 30 nanometers to 2 microns, including all values to the nanometer and ranges therebetween. For example, the microparticles have a plurality of substantially spherical discrete voids having a size of 30 nanometers to 300 nanometers, including all values to the nanometer and ranges therebetween, and/or a plurality of agglomerates having a size of 30 nanometers to 2 microns, including all values to the nanometer and ranges therebetween. The substantially spherical void size is measured as the longest linear dimension, e.g., the diameter, of the void.

The voids can be substantially monodisperse. By "substantially monodisperse", it is meant that at least 90% of the voids have a size within 20% of the average void size. In various embodiments, at least 90% of the voids have a size within 15%, 10%, 5%, or 1% of the average void size. Without intending to be bound by any particular theory, it is considered that the voids are substantially monodisperse because the polymer subparticles, i.e., polymer nanoparticles, inside a droplet are formed by dispersion polymerization that led to a uniform size distribution of precipitating particles following the law of thermodynamics of phase separation.

The spatial arrangement of the voids in the oxide microparticles can vary. In an embodiment, the voids are randomly packed. This spatial arrangement can result because the voids correspond to polymer nanoparticles formed by dispersion polymerization inside a suspended organic droplet that is transformed to the organic polymer microparticle. In another embodiment, the voids are partially hexagonal close packed (HCP). By partially HCP, it is meant that the voids approximate a HCP structure, but have defects and do not exhibit long range HCP structure.

The oxide phase of the oxide microparticles is porous. The porosity depends on, for example, the extent of hydrolysis of the oxide precursor and densification processes, if any. The oxide phase can have a broad pore size distribution (e.g., as demonstrated in FIG. 9). The pores of the oxide phase are different structural features than the void spaces. The pores connect the void spaces and provide connectivity between voids and form voids to the atmosphere external to the microparticle (e.g., the pores allow monomer, reactants, solvent, etc. to move in and out of the microparticle). The pore width (pore size) can be from 10 Angstroms to 800 Angstroms, including all values to the Angstrom and ranges therebetween.

The porous oxide microparticles have large surface area resulting at least in part from the presence of voids in the microparticles. The surface area of the particles can be determined using, for example, $N_2$ sorption and BET measurements that are known in the art. For example, the surface area of the particles measured by BET is 200 to 600 $m^2/g$, including all integer values to the $m^2/g$ and ranges therebetween. The pore volume of the particles can be 0.1 to 0.75 $cm^3/g$, all values to the 0.05 $cm^3/g$ and ranges therebetween.

The porous oxide microparticles have a low density. The density can be estimated from mass fraction data. For example, the density of the particles can be from 0.08 to 0.34 $g/cm^3$, including all values to the 0.01 $g/cm^3$ and ranges therebetween.

In an embodiment, the substantially spherical, porous oxide microparticle further comprises a catalyst covalently bonded to at least a portion of a surface of the microparticle, and, optionally, a co-catalyst covalently bonded to at least a portion of a surface of the microparticle.

The catalyst and/or co-catalyst can be covalently bound to a surface of the microparticle by reaction with a surface Si—OH group. The surface can be an external surface, an internal surface (e.g., pore surface or void surface), or a combination thereof. The catalyst and/or co-catalyst can be covalently bound to a surface of the microparticle by reaction with a functional group (e.g., an amine or carboxylate) that is present on the microparticle. Functionalization of the microparticle to provide suitable functional groups is known in the art.

The type of catalyst covalently bound to the surface of the microparticle can vary. Any catalyst that can be attached to a solid oxide support can be bound to the microparticle. Suitable catalysts are well known in the art. In an embodiment, the catalyst covalently bound to the surface of the microparticle is a metallocene catalyst and a co-catalyst. For example, the metallocene catalyst is a catalyst such as Et(1-indenyl)$_2$ZrCl$_2$ (EBI).

The type of co-catalyst covalently bound to the surface of the microparticle can vary. In an embodiment, the co-catalyst covalently bound to the surface of the microparticle is an alkyl aluminum compound. For example, the alkyl aluminum can be methylaluminoxane (MAO), modified methylaluminoxanes, aluminum alkyls, or halides of aluminum alkyls. In an embodiment, when the catalyst is a metallocene catalyst, the co-catalyst is a methylaluminoxane (MAO).

The catalyst and co-catalyst can be present over a broad a range of loadings. For example, the catalyst is present at $1.0 \times 10^{-5}$ to $1.0 \times 10^{-4}$ mol-metal/g. For example, the co-catalyst is present at a mole ratio of [aluminum]/[catalyst metal] 300 to 5,000 mol/mol.

In an aspect, the present invention provides a substantially spherical, porous oxide-organic polymer composite microparticle. The composite microparticles can have a wide range of sizes, e.g., from 1 micron to 2 millimeters, including all values to the micron and ranges therebetween. The microparticle comprises an organic polymer shell (also referred to herein as a pericellular membrane) and a plurality of organic polymer domains, and an oxide phase. The plurality of organic polymer domains are disposed in the oxide phase.

The porous oxide-organic polymer composite microparticles can have a broad range of polymer shell thicknesses. For example, the porous oxide-organic polymer composite microparticles have an organic polymer shell having a thickness of 50 nanometers to 3 microns, including all values to the nanometer and ranges therebetween.

Figure 5:
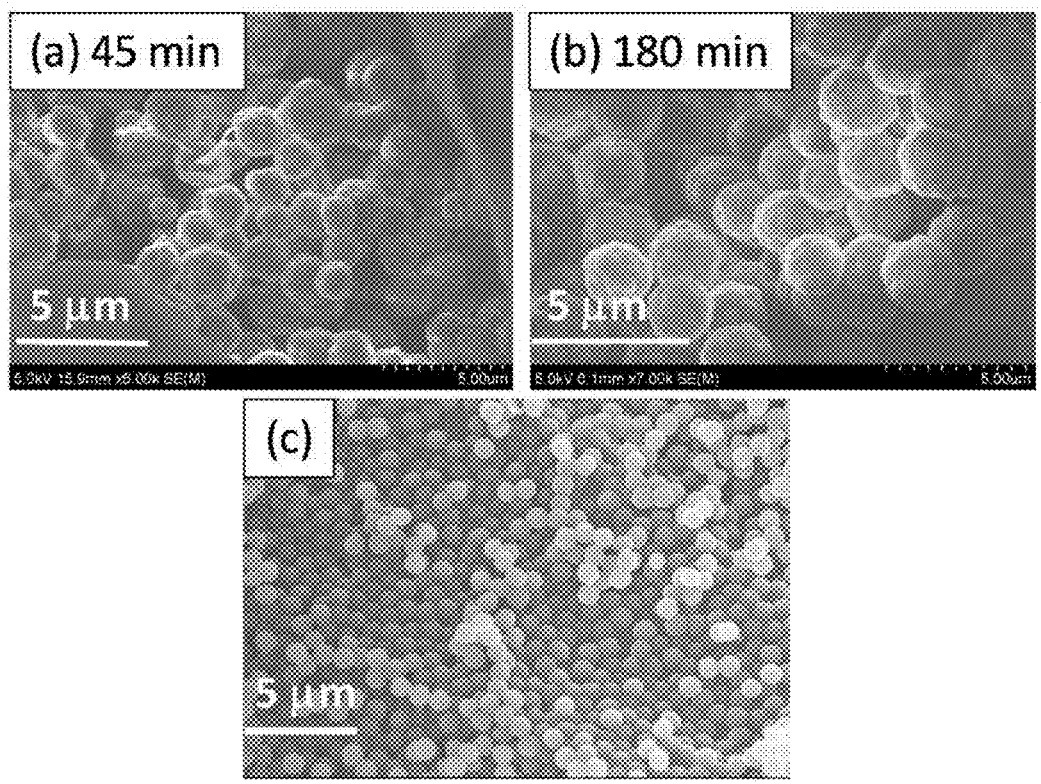
FIG. 5. Representative SEM images of an example of an interior of pomegranate-like PMMA particles after (a) 45 minutes and (b) 180 minutes of reaction showing the agglomerates of c.a. 50 nm-diameter primary particles. (c) Representative SEM image of PMMA particles obtained by macroscopic dispersion polymerization FIG. 6. Example of $SiO_2$/PMMA weight ratio at different immersion times in HCl solution.

The porous oxide-organic polymer composite microparticle have organic polymer domains that can have a broad range sizes. For example, the polymer domains of the plurality of substantially spherical organic polymer domains have a diameter of 30 to 300 nanometers, including all values to the nm and ranges therebetween. The organic polymer domains can agglomerate to a size of 1 to 3 microns (e.g., FIG. 5). For those having skill in the art, it is known that the organic polymer domain size can be varied by the reaction conditions such as initiator concentration, temperature, monomer concentration, solvent concentration, and stabilizer concentration. The organic polymer domains can correspond to the organic polymer nanoparticles of an organic polymer nanoparticle.

The organic polymer domains are formed from a polymer. Examples of suitable polymer include polymethacrylate, poly(methyl methacrylate) (MMA), polystyrene, and poly(vinyl acetate). The organic polymer domains can be formed from copolymers.

In an aspect, the present invention provides an organic polymer microparticle. The microparticles can have a wide range of sizes, e.g., from 1 micron to 2 millimeters, including all values to the micron and ranges therebetween. The microparticle comprises an organic polymer shell, a plurality of organic polymer nanoparticles and/or agglomerates of the nanoparticles, and alkoxy oxide precursor.

In an aspect, the present invention provides a method for making a plurality of substantially spherical, oxide-organic polymer composite microparticles. The methods include a microdispersive suspension polymerization step, where the organic polymer formed during the polymerization is insoluble in the solvent resulting in formation of the organic polymer microparticles having a plurality of organic polymer nanoparticles disposed therein.

In an embodiment, the present invention provides a method for making a plurality of substantially spherical, oxide-organic polymer composite microparticles having a diameter of 5 to 350 microns, the composite microparticle having a plurality of substantially spherical domains of organic polymer having a longest linear dimension, e.g., diameter, of 30 to 300 nanometers and/or agglomerates having a longest linear dimension of 30 nanometers to 2 microns disposed in an oxide and an organic polymer shell comprising the steps of:
 a) contacting an organic polymer precursor, an alkoxy oxide precursor, a chemical initiator, a steric stabilizer, organic solvent, and water to form a reaction mixture comprising a suspension of organic solvent droplets;
 b) holding the reaction mixture for a time and temperature such that the droplets are transformed by polymerization of the organic polymer precursor to organic polymer microparticles having a plurality of substantially spherical organic polymer nanoparticles and/or agglomerates of the substantially spherical organic polymer nanoparticles and organic polymer shell, wherein the alkoxy oxide precursor is substantially unreacted;
 c) optionally, contacting the microparticles from b) with additional alkoxy precursor; and
 d) contacting the microparticles from b) or c) with an acid catalyst such that oxide is formed by hydrolysis of the alkoxy oxide precursor resulting in formation of the substantially spherical, oxide-organic polymer composite microparticles.

In an embodiment, the method for making a plurality of substantially spherical, oxide-organic polymer composite microparticles further comprises the steps of:
 e) removing substantially all of the organic polymer by calcination or dissolution, and
 f) optionally, contacting the microparticles from e) with a catalyst and, optionally, a co-catalyst, such that at least a portion of a surface of the microparticles is functionalized with the catalyst.

In an embodiment, the oxide-organic polymer composite microparticles are partially calcined. Such partial calcinations result in polymer-silica composites with varying silica or polymer content that are different from the original polymer-silica composition of the microparticles recovered from the microdispersive suspension polymerization and subsequent acid-catalyzed silica formation reaction.

The method of the invention has a unique feature in that a thin pericellular membrane is formed at the water droplet interface while a dispersion polymerization occurs at the inner region of the suspended droplet. As the organic polymer precursor increases with time, the population of the precipitated polymer particles within the droplets increases and eventually the interior of the microparticles can be filled with polymer subparticles, i.e., organic polymer nanoparticles, with alkoxy oxide precursor/anti-solvent filling the interstitial void space.

The oxide-organic polymer composite microparticles are formed using an organic polymer precursor. The organic polymer precursor can be any organic vinyl monomer that can be suspension polymerized. Examples of suitable organic polymer monomer include methacrylate, methyl methacrylate (MMA), styrene, and vinyl acetate. Combinations of organic polymer precursors can be used.

The oxide-organic polymer composite microparticles are formed using an alkoxy oxide precursor. The precursor comprises moieties (e.g., a plurality of alkoxide moieties) that can hydrolyze to provide hydroxyl groups that can condense to form oxide bonds (e.g., —Si—O—Si—) and the porous bulk oxide. The precursors are substantially unreacted after formation of the organic polymer microparticles. By substantially unreacted it is meant that the precursors can be hydrolyzed to form an oxide phase. In various embodiments, less than 20% of the precursors are hydrolyzed, less than 10% of the precursors are hydrolyzed, less than 5% of the precursors are hydrolyzed, and less than 1% of the precursors are hydrolyzed. In an embodiment, the precursors are not detectably hydrolyzed. The precursors react to form oxide in the interstices in the organic polymer microparticles. In an embodiment, the organic polymer microparticles are contacted with additional alkoxy oxide precursor (in addition to the alkoxy oxide precursor in the reaction mixture).

The alkoxy oxide precursor can be sol-gel precursors known in the art. Examples of suitable oxide precursors includes alkoxide compounds such silicon alkoxides (i.e., alkoxysilanes), titanium alkoxides, and zirconium alkoxides. Combinations of precursors can be used. In an embodiment, the alkoxy oxide precursor is an alkoxysilane. Examples of suitable precursors include tetraaklyl orthosilicates such as tetramethyl orthosilicate (TMOS), tetraethyl orthosilicate (TEOS), and tetrapropyl orthosilicate (TPOS). The precursors do not have significant solubility in water. In an embodiment, the precursors are insoluble in water. Mixtures of silica precursors can be used. Examples of suitable titanium alkoxide precursors include titanium ethoxide, titanium propoxide, titanium isopropoxide, titanium butoxide. Zirconium tetrabutoxide is an example of a suitable zirconium alkoxide precursor. The precursors can be present in the organic reaction mixture at 20 to 40 wt. %, including all integer values and ranges therebetween.

The oxide-organic polymer composite microparticles are formed using a chemical initiator. For example, the chemical initiator is an organic peroxide, organic peroxy ester, or an azo compound. Examples of suitable chemical initiators include azobisisobutyronitrile (AIBN), lauroyl peroxide, di-tert-butyl peroxide (DTBP), benzoyl peroxide, 4,4'-azobis(4-cyanovaleric acid), dicumyl peroxide. Bifunctional, tri-functional, and multi-functional initiators such as 2,2-bis(tert-butylperoxy)butane can also be used. The chemical initiator can be present in the reaction mixture across a broad range of concentrations based on the reaction conditions. For example, one having skill in the art will appreciate that at lower reaction temperatures more initiator is used and at high reaction temperature less initiator is used. Typical concentrations range from 0.01 to 0.5 wt. %, including all values to the 0.01 wt. % and ranges therebetween.

The oxide-organic polymer composite microparticles are formed using a steric stabilizer. The steric stabilizer provides a repulsive effect between polymer nanoparticles inside a microdroplet or microparticle to prevent the agglomeration of nanoparticles formed by microdispersive suspension polymerization. Examples of suitable steric stabilizers include polydimethy siloxane (PDMS), methacryloxypropyl terminated PDMS, poly(vinyl pyrolidone), poly(12-hydroxy-stearic acid), polystyrene-block(polyethylene-co-polypropylene), and nonionic surfactants such as sorbitane monooleate. The amount of steric stabilizer present in the reaction mixture can depend on the amount of organic polymer present. Generally, more steric stabilizer is used with increasing organic polymer. The amount of steric stabilizer can be present in the reaction mixture at 0.5 to 1.0 wt. %. In an embodiment, partially hydrolyzed polyvinyl alcohol is dissolved in the aqueous phase to stabilize the suspension of organic droplets formed at the surface of the aqueous phase.

The oxide-organic polymer composite microparticles are formed using a solvent. The solvent includes an aqueous phase (e.g., water) and an organic phase (e.g., an organic solvent). The organic polymer formed by polymerization of the monomer is not soluble in the organic phase and precipitates in the suspended droplet formed during the polymerization. Hence, the organic phase is referred to as an anti-solvent for the polymer. The initial composition of monomer and anti-solvent is an important parameter for the formation of organic polymer nanoparticles inside a droplet. The initial composition of an organic phase is chosen such that organic polymer nanoparticle precipitation is induced inside suspended droplets as monomer conversion increases with reaction time. For example, to obtain a pomegranate-like internal structure using MMA and hexane, the initial MMA/n-hexane ratio (w/w) should be smaller than 4.0 but larger than 3.0. The aqueous phase and the organic phase (referred to as the anti-solvent) are collectively referred to as the solvent of the reaction mixture. Any organic solvent that mixes with monomer (e.g., MMA) but does not dissolve the polymer being produced can be used. Examples of suitable anti-solvents include n-hexane, cyclohexane, and n-heptane.

The oxide-organic polymer composite microparticles are formed using an acid catalyst. The organic polymer microparticles are contacted with the acid catalyst to initiate hydrolysis of the alkoxy oxide precursor and formation of the oxide. Examples of suitable acid catalysts include hydrochloric acid (HCl), acetic acid, nitric acid, and trifluoroacetic acid.

The organic polymer domains of the substantially spherical oxide-organic polymer composite microparticles can be removed to form the substantially spherical oxide microparticles. The domains can be removed by, for example, pyrolysis, calcination, or dissolution.

The reactants are contacted under reaction parameters (e.g., reaction time, reaction temperature, pH of aqueous phase, suspension stabilizer, and mixing (type and amount)) to provide the desired particle (microparticle and nanoparticle) sizes. Selection of the appropriate reaction parameters is within the purview of one having skill in the art.

In an embodiment, the substantially spherical oxide microparticles are formed by a method described herein. In an embodiment, the substantially spherical oxide-organic polymer composite microparticles are formed by a method described herein. In an embodiment, the substantially spherical organic polymer microparticles are formed by a method described herein.

The steps of the methods described in the various embodiments and examples disclosed herein are sufficient to produce microparticles of the present invention. Thus, in an embodiment, the method consists essentially of a combination of the steps of the methods disclosed herein. In another embodiment, the method consists of such steps.

In an aspect, the present invention provides polymerization methods that use the microparticles as catalyst supports. The microparticles can be used in a variety of polymerizations that use silica-supported catalysts. Such polymerizations are known in the art. The oxide microparticles can be used in polymerizations such as, for example, olefin polymerization reactions, Fischer-Tropsch synthesis, CO oxidation, and liquid phase hydrogenation. In an embodiment, the oxide microparticles are used as catalyst supports. In an embodiment, the oxide microparticles comprising an olefin polymerization catalyst and, optionally, a co-catalyst, are used as catalysts in olefin polymerization reactions.

In embodiment, the method is an olefin polymerization. It was surprisingly found that the initial catalytic activity of the oxide microparticle catalysts was increased by 16 times and the polymer yield increased by 4 times compared to conventional and commercial silica particles. In various embodiments, initial catalytic activity of oxide microparticle catalysts is increased by 10 times, 5 times, and 2 times compared to conventional and commercial silica particles. In various embodiments, the polymer yield obtained using oxide microparticle catalysts is increased by 3 times or 2 times compared to the same process using conventional and commercial silica particles.

In an embodiment, the olefin polymerization method comprises the steps of: a) forming a reaction mixture comprising a plurality of oxide microparticles comprising a catalyst and, optionally, a co-catalyst, a monomer, and, optionally, a solvent, b) holding the reaction mixture for a time and temperature such that the monomer is polymerized to a desired extent to form a polymer. Optionally, the polymer is isolated from the reaction mixture. The polymerization can be conducted either in batch reactors or in continuous reactors including continuous stirred tank reactors (CSTRs), loop reactors, fluidized bed gas phase reactors, and any combination of these reactors. Selection of suitable reaction conditions (e.g., time, temperature, atmosphere), reactor types, and reaction mixture components is within the purview of one having skill in the art.

The following examples are presented to illustrate the present invention. They are not intended to limiting in any manner.

Example 1

The following describes an example of a synthetic technique for preparation of silica inverse opal-like micro-spheres of high specific surface area and very small bulk density and polymer/silica nanocomposites. Micron-sized polymer microspheres of core-shell structure where the core contains nano-sized uniform polymer particles were synthesized by micro-dispersive suspension polymerization wherein a suitable alkoxysilane precursor is added with monomer mixture. In a second stage, an adequate catalyst is infiltrated into the particles to induce the hydrolysis/condensation of the alkoxysilane in the interstices of the particles. In a third stage, the polymer portion was selectively removed by calcination or dissolution to produce ultra-porous silica particles or silica inverse opals. The material apparent density and internal surface area resemble to those of silica aerogels. The synthetic technique described in this example can be applied to the preparation of titania and zirconia microparticles having similar morphological characteristics.

In this example, a novel polymerization technique to produce polymer microparticles of complex internal structure capable of encapsulating alkoxysilanes that can be subsequently polymerized by the sol-gel technique is described (see FIG. 1). During the suspension polymerization, the monomer was polymerized in the presence of the alkoxysilane, a suitable solvent, a chemical initiator, and a steric stabilizer to induce the intra-droplet phase separation. In this stage, both the precipitation of nano-particles inside the suspended monomer droplets and the formation of a droplet pericellular membrane were promoted (see FIGS. 2a-b). Thereafter, an acid catalyst was allowed to diffuse from a concentrated solution to the interior of the polymer microspheres swollen with the alcoxysilane. As a result of the hydrolysis-condensation reaction, polymer nano-spheres in the interior of the polymer micro-particles were coated with a silica thin film of ~40 nm thickness (see FIGS. 2c-d). In addition, the polymeric template can also be selectively removed by calcination or dissolution, leaving behind an ultra-porous silica structure (see FIGS. 2e-f).

Figure 2:
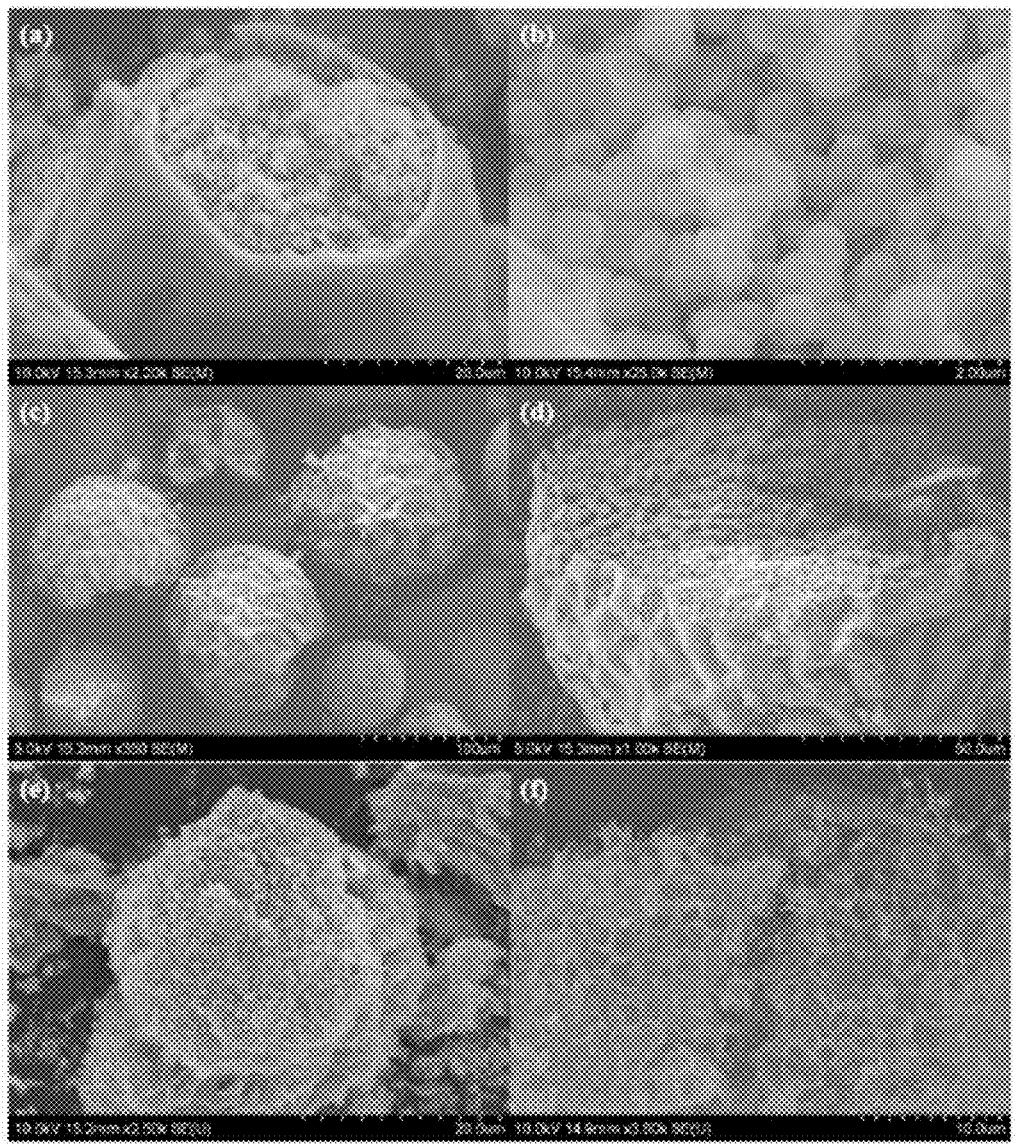
FIG. 2. Representative SEM images of the produced micro-spheres at different stages of the process shown in FIG. 1. (a-b) polymeric template; (c-d) polymer/silica composite; (e-f) ultra-porous silica structure.

As a model system, the technique proposed in this example was applied to poly(methyl methacrylate) particles synthesized by micro-dispersive suspension polymerization in the presence of tetraethyl orthosilicate (TEOS). Hydrogen chloride (HCl) was used as catalyst. The polymer template was calcined at high temperature to eventually produce an ultra-porous silica structure. FIG. 2 shows the morphological characteristic of the particles at all stages of the proposed technique. Energy dispersion X-Ray (EDX) analysis has been used to map the elemental composition of several samples, and the presence of silica after the last two stages of the proposed technique (i.e., sol-gel reaction and calcinations) has been confirmed. Moreover, the complete removal of the polymer template after calcination has been also confirmed by EDX (i.e., negligible amount of carbon was observed). For the ultra-porous silica structure, the bulk density was found to be in the order of 0.05 g/cm$^3$. BET surface area was found to be close to 600 m$^2$/g, which is about twice larger than commercial porous silica gel particles of the same size (e.g., Davisil® Grade 643). These properties of the final material fall in the range of those of silica aerogel.

Example 2

This example describes the synthesis of a three-dimensional and spherical silica particle with a pseudo-inverse opal structure using pomegranate-like polymer micro-particles as a template. The template polymer particles were prepared by micro-dispersive suspension polymerization where phase separation is induced during the course of polymerization within a monomer-containing organic liquid droplet suspended in an aqueous medium. The micro-dispersion polymerization occurring in each suspended monomer droplet in presence of a silica precursor led to the formation of nearly monodisperse polymer sub-particles of about 1 μm size randomly-packed within a 30-100 μm polymer particle. The polymerization was followed by acid-catalyzed reaction that induced the formation of silica in the interstices between micro sub-particles within a polymer particle. A spherical pseudo-inverse opal silica (PIOS) particle was produced by selectively removing the polymer template by pyrolysis. The resulting PIOS particles showed large specific surface areas with unique pore geometry and pore size distribution.

In this example, an experimental method to prepare large micrometer-sized (30-100 μm) spherical silica particles that have an internal structure or morphology of pseudo-inverse opals is presented. The technique is based on a polymer template particle having a particles-in-a-particle structure, synthesized by a modified suspension polymerization called the micro-dispersive suspension polymerization. Here, each silica inverse opal micro-particle is composed with 0.5-1.5 μm "hollow" silica sub-particles surrounded by thin solid walls with interconnecting circular pores. These sub-particles are not packed in a geometrically perfect hexagonal array because they are formed within a reacting polymer particle without any external forces such as gravity or centrifugal forces, but the morphology of the spherical silica particle interior very much resembles the inverse opal structure. Hence, the silica particles synthesized in this example are referred to as pseudo-inverse opal silica (PIOS) particles. The unique identity of the PIOS particles is that it is a micro meter sized spherical particle, not a layered structure. It was observed that the PIOS particles synthesized in this example had large surface areas compatible with commercially available silica particles and broad pore size distributions that are quite different from those of conventional silica particles.

Figure 3:
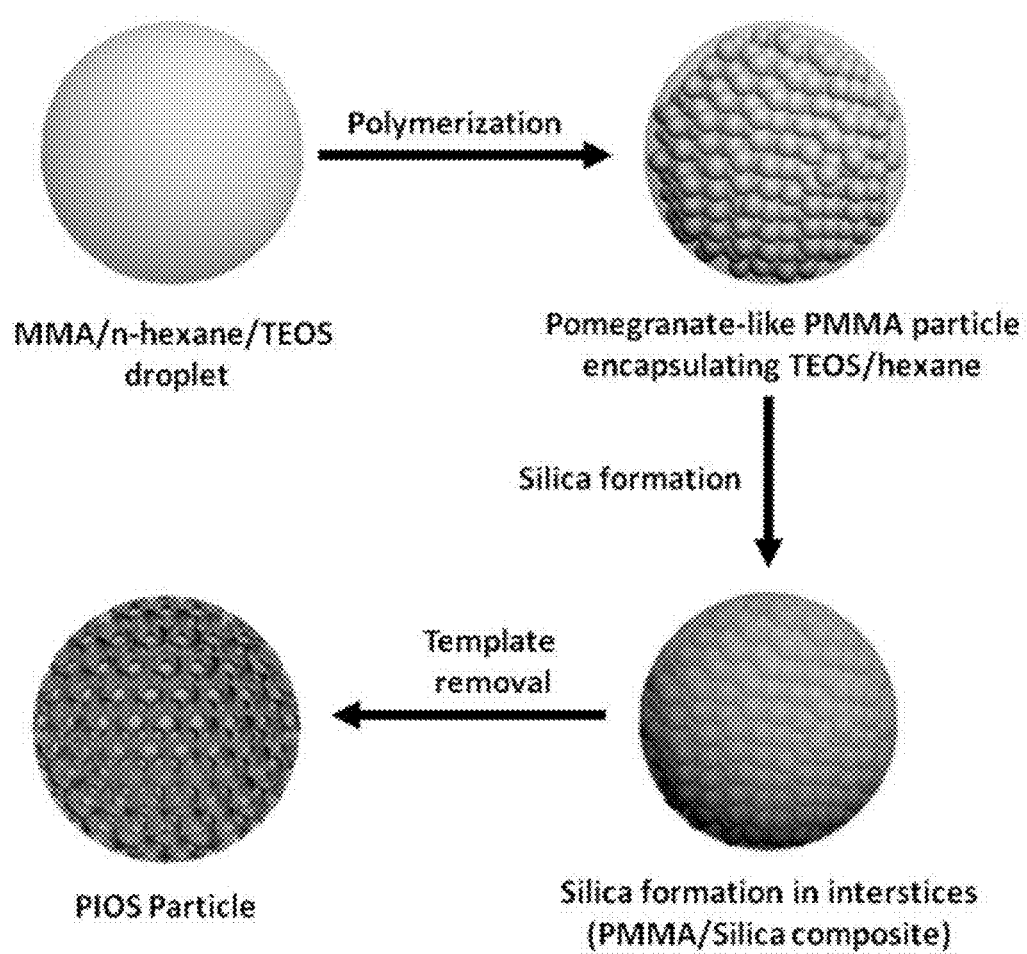
FIG. 3. An example of a synthetic procedure of pseudo-inverse opal silica particles.

Experimental. The typical synthesis process for PIOS particles is illustrated in FIG. 3. An important stage in this process involves the preparation of a template polymer particle having a unique pomegranate-like interior structure by the modified suspension polymerization technique. The template particle consists of a relatively thick shell (or skin) and smaller subparticles packing the interior of the large polymer particle. The interstices or void spaces between these sub particles are infiltrated in the next stage by a silica precursor (TEOS). Then, the particle template was impregnated with a sol-gel catalyst to induce the hydrolysis/condensation of TEOS in the interstitial space within the particle, and finally the polymer was selectively removed.

Synthesis of pomegranate-like template polymer particles. The pomegranate-like polymer particles used as a template for PIOS particle synthesis were prepared by a micro-dispersive suspension polymerization technique. In a typical polymerization experiment, an organic phase containing 48.3 wt. % of monomer (MMA, Aldrich), 19.7 wt. % of n-hexane (anti-solvent for PMMA), 30.0 wt. % of TEOS, 0.7 wt. % of methacryloxypropyl-terminated polydimethyl siloxane (PDMS, MW=4000-6000 g/mol, Gelest) and 1.3 wt. % of lauroyl peroxide (Across Organics) was suspended in a 700 mL de-ionized water as suspended micro-droplets by mechanical agitation at 500 rpm. The organic droplets (10-150 μm) were stabilized by partially hydrolyzed poly(vinyl alcohol) (89% hydrolyzed, MW=85,000-124,000 g/mol, 0.015 g/g-H$_2$O, Sigma) previously dissolved in the aqueous phase. The initial composition of MMA-n-hexane mixture is chosen such that the PMMA produced does not dissolve in the liquid phase within droplets. In other words, the reaction path within a droplet is always below the binodal curve for MMA/hexane/PMMA ternary system so that particle nucleation and growth occur during the entire course of polymerization. The polymerization was carried out at 70° C. for 45 minutes or 180 minutes to make the polymer particles of different size. The polymer particles thus obtained were used as a template for PIOS particles. The PIOS particles prepared using the pomegranate-like template polymer particles obtained at 45 minutes and 180 minutes of reaction are labeled as PIOS-45 and PIOS-180, respectively.

A thin pericellular membrane (or skin) was formed in early stages of polymerization at the water and organic droplet interface while a dispersion polymerization occurs in the inner region of suspended droplet. This is why it is called it micro-dispersive suspension polymerization. As the MMA conversion increases with time, the population of precipitated PMMA particles within the droplets increases and eventually the interior of the final polymer particles were packed with PMMA sub-particles (0.5-1.5 μm) with TEOS/hexane filling the interstitial void space. It should be noted that the size of PMMA sub-particles formed by micro-dispersive polymerization mechanism was much larger than typical colloidal or latex particles (<0.1 μm) synthesized by emulsion polymerization technique. Therefore, it was not possible to use emulsion polymerization to make the pomegranate-like polymer particles as synthesized in this work.

Since the suspended droplet contains n-hexane and TEOS, there is a limitation in the total number of PMMA sub-particles that can be formed within a droplet even after the complete conversion of MMA. If MMA content is too large, PMMA partially dissolves in the liquid phase and a pomegranate-like interior structure is not obtainable. On the other hand, if MMA content was too small, the packing density of PMMA sub-particles within a larger polymer particle becomes low and deformed core-shell type of particles were obtained. Also, it was noted that both TEOS is also an antisolvent for PMMA and hence, it promotes the precipitation of PMMA with n-hexane. The morphology of the polymer particles obtained was similar to that of a pomegranate and hence call them as pomegranate-like particles.

Pseudo-inverse opal silica particles. The second step was the impregnation of these pomegranate-like template particles containing TEOS with a hydrochloric acid solution. The template PMMA particles containing TEOS were immersed in a hydrochloric acid solution (3.3 wt. % in water-isopropyl alcohol mixture) and TEOS present in the void space of the particles was allowed to undergo sol-gel reaction to form silica. The resulting particles were PMMA-silica composite particles with silica content of 10-30 wt. %. Finally, the PMMA-silica composite particles were dried to remove n-hexane and calcined to remove the polymer in a muffle furnace at 500° C. for 10 hours and ultraporous PIOS particles were obtained.

Characterization of template and PIOS particles. The morphology of the template polymer particles (i.e., pomegranate-like polymer micro-particles), acid-treated particles, and the PIOS particles were analyzed by scanning electron microscopy (Hitachi S-4700). The sample particles were coated with AuPd layers in a Denton DV-503 vacuum evaporator. X-ray diffraction (XRD) analysis was performed using a Bruker D8 Advanced with GADDS (Bruker AXS). $N_2$ adsorption-desorption BET isotherms of the PIOS particles were obtained at 77 K on a Micrometritics ASAP2020 apparatus and the pore size distribution was measured using the Barrett-Joyner-Halenda (BJH) method.

Figure 4:
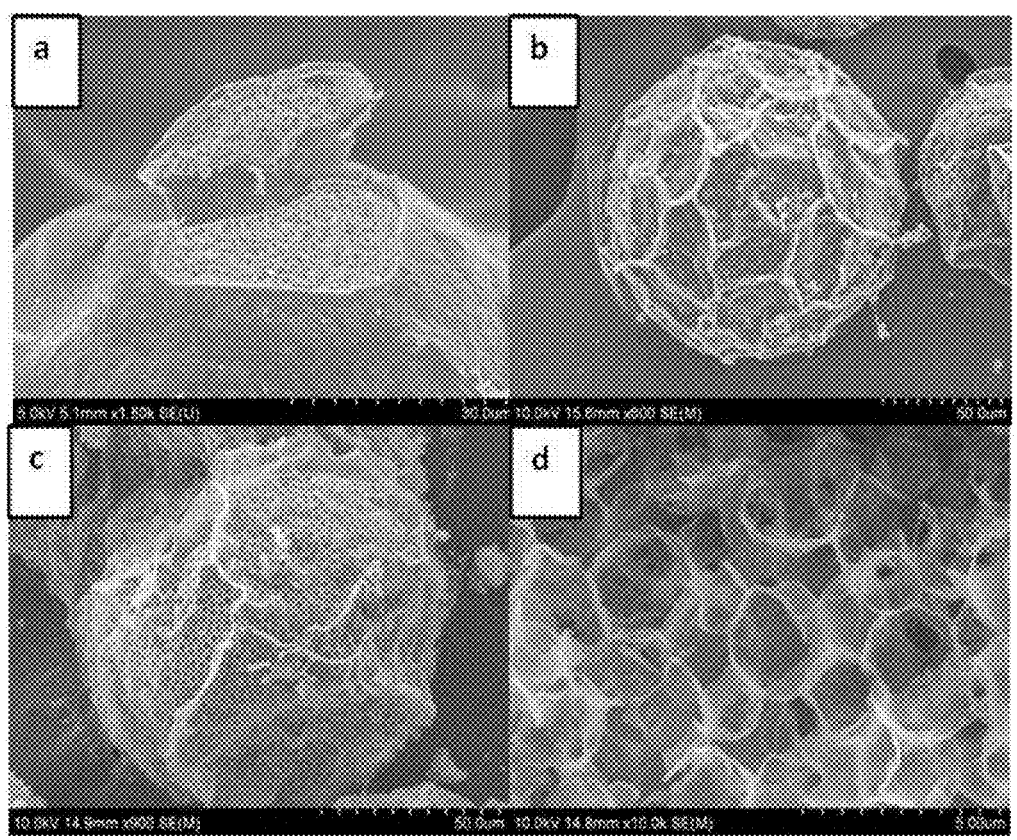
FIG. 4. Representative (a) SEM image of a pomegranate-like template particle synthesized by microdispersive suspension polymerization for 3 hours at 70° C. (b) Polymer particle after impregnation with hydrochloric acid. (c) Spherical silica particle obtained by the pyrolysis of the acid treated polymer particle. The interior structure of the silica particle is visible through a thin silica film at the surface. (d) Magnified SEM image of the PIOS particle interior showing close packed silica hollow spheres.

Morphology of the PIOS particles. The morphologies of template polymer particles and the PIOS particles were investigated by scanning electron microscopy (SEM). FIG. 4 shows the SEM images of template polymer particles obtained after 180 minutes of polymerization time (PIOS-180) (FIG. 4a), the polymer-silica composite particle obtained after the HCl solution impregnation for 2 hours (FIG. 4b), and PIOS particle obtained after the removal of polymeric template (FIG. 4c, d). Although the interior morphologies of template particles (i.e., pomegranate-like structure) and resulting PIOS particles were dependent on the specific reaction conditions, the images in FIG. 4 are the most representative of the particles at different processing stages. The template polymer particle morphology in FIG. 4(a) shows that the micron-size polymer particle was packed with sub-polymer particles of about 1.0 μm that were very similar to those commonly observed in regular dispersion polymerization processes. FIG. 4b shows a particle obtained after HCl impregnation. As unreacted monomer and solvent (n-hexane, 25 vol. %) present in the interstices of the sub-particles were removed by drying during the sample preparation, the particle surface shrivelled forming a loose network of honeycomb-like wrinkles of 2-3 μm wide. It is interesting to observe that the shrivelled PMMA-silica composite particle surface was translucent and the particle interior is partially visible through the surface layer. After polymer was burnt out by calcinations, the particle surface layer (silica layer) became more transparent as shown in FIG. 4c. Through this surface silica film, the interior structure of the PIOS particle was observed. FIG. 4d shows the magnified view of an intentionally broken PIOS particle after calcination. Notice that each hollow silica particle of 1-2 μm in diameter is surrounded by ca. 70 nm shell (skin). Also, these sub-particles were not packed in a perfectly hexagonal array and hence the resulting PIOS particles show a pseudo-inverse opal-like structure.

FIG. 5a and FIG. 5b show images of the interior structure of two pomegranate-like polymer particles obtained after 45 minutes and 180 minutes of polymerization. The micro-polymer particles of 1-2 μm-diameter were observed, formed by dispersion polymerization inside each monomer-solvent droplet, are the agglomerates of 50-70 nm primary particles. The size of micro-polymer particles grow from about 1 μm at 45 minutes of reaction time (PIOS-45) to 2 μm at 180 minutes (PIOS-180), suggesting that the size of polymer micro-particles was controlled by reaction time or monomer conversion. Also shown in FIG. 5c is the SEM image of PMMA particles obtained by macroscopic dispersion polymerization. The size of the polymer particles shown in FIG. 5c is 1-2 μm, indicating that the dispersion polymerization that occurred within each suspended droplets followed the same particle forming mechanism as macroscopic dispersion polymerization.

Figure 6:
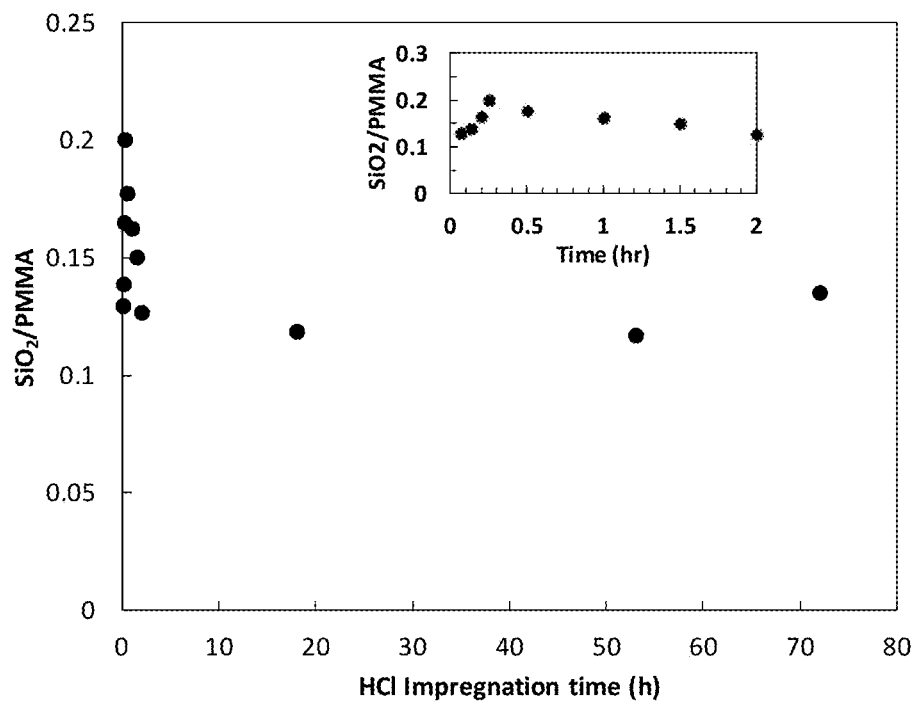

The amount of silica that can be recovered after calcining the template particles depends on several factors such as immersion time of polymer particles in HCl solution, MMA/solvent (TEOS+n-hexane) ratio, n-hexane/TEOS ratio, and reaction time. FIG. 6 illustrates the effect of immersion time of polymer particles in HCl solution on the yield of silica per weight of PMMA template particles. Although sol-gel reaction occurred very fast (less than 4 minutes), the silica/PMMA reaction reached a maximum of about 0.2 g/g at 15 minutes, and then it decreases gradually to about 0.15 g/g and remained nearly constant after 2 hours. The sol-gel reaction of TEOS under acidic conditions involves the hydrolysis/ esterification of TEOS, alcohol condensation/alcoholysis, and water condensation/hydrolysis reactions as follows:

$$SiOR + H_2O \rightleftharpoons SiOH + ROH \quad (1)$$

$$SiOR + SiOH \rightleftharpoons Si\text{—}O\text{—}Si + ROH \quad (2)$$

$$SiOH + SiOH \rightleftharpoons Si\text{—}O\text{—}Si + H_2O \quad (3)$$

Since reactions (2) and (3) are reversible, silica can suffer both alcoholysis and hydrolysis, and the presence of a maximum in silica formation (e.g., inset in FIG. 6) was theoretically feasible. The MMA/solvent (TEOS+n-hexane) ratio is also an important parameter. For the MMA/solvent (v/v) ratio in the range of 0.6-2.0, the maximum $SiO_2$/PMMA value obtained in this example was 0.274 and the minimum was 0.114. The smaller the sub-particle size was, the higher the silica/PMMA ratio was. For example, silica/PMMA ratios were 0.236, 0.183, and 0.139 when the template particles obtained after 45 minutes, 90 minutes, and 180 minutes of polymerization were used. The maximum silica yield per polymer can be found by optimizing the reaction conditions and composite particle processing conditions.

Figure 7:
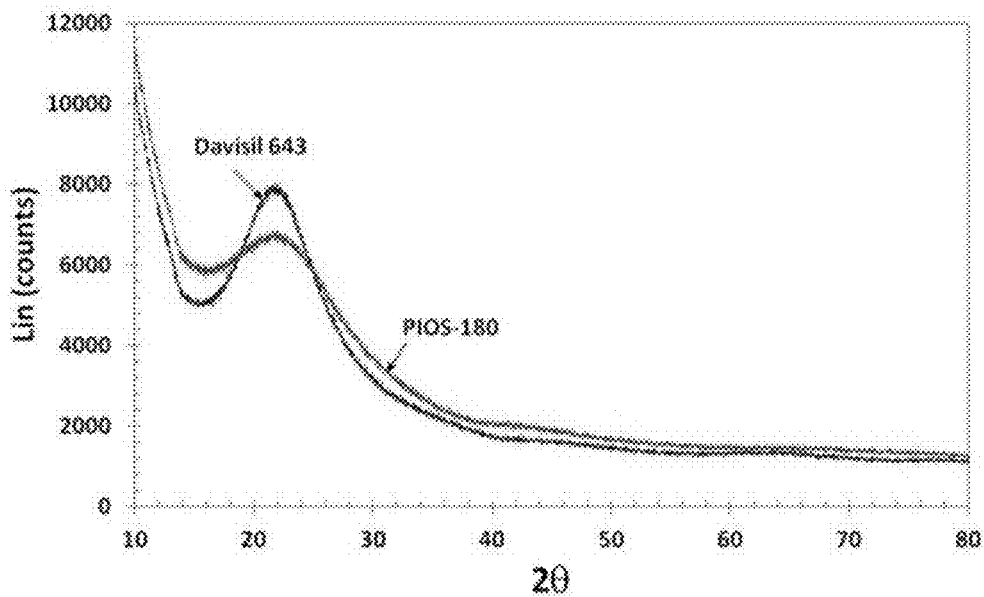
FIG. 7. Representative X-ray diffraction patterns of PIOS and Davisil 643 silica particles.

Structural properties of PIOS particles. The X-ray diffraction (XRD) pattern of a PIOS particle sample is shown in FIG. 7. Here, the sample PIOS-180 represents the polymer particle sample taken after 180 minutes of polymerization in preparing the template polymer particle by micro-dispersive polymerization. Also shown in FIG. 7 is the XRD pattern of a commercial silica gel particle (Davisil® 643, Sigma) for comparison. A broad peak ranging from 15 to 30° in 2θ angle for PIOS particles indicated that they are completely amorphous like commercial silica particles.

Figure 8:
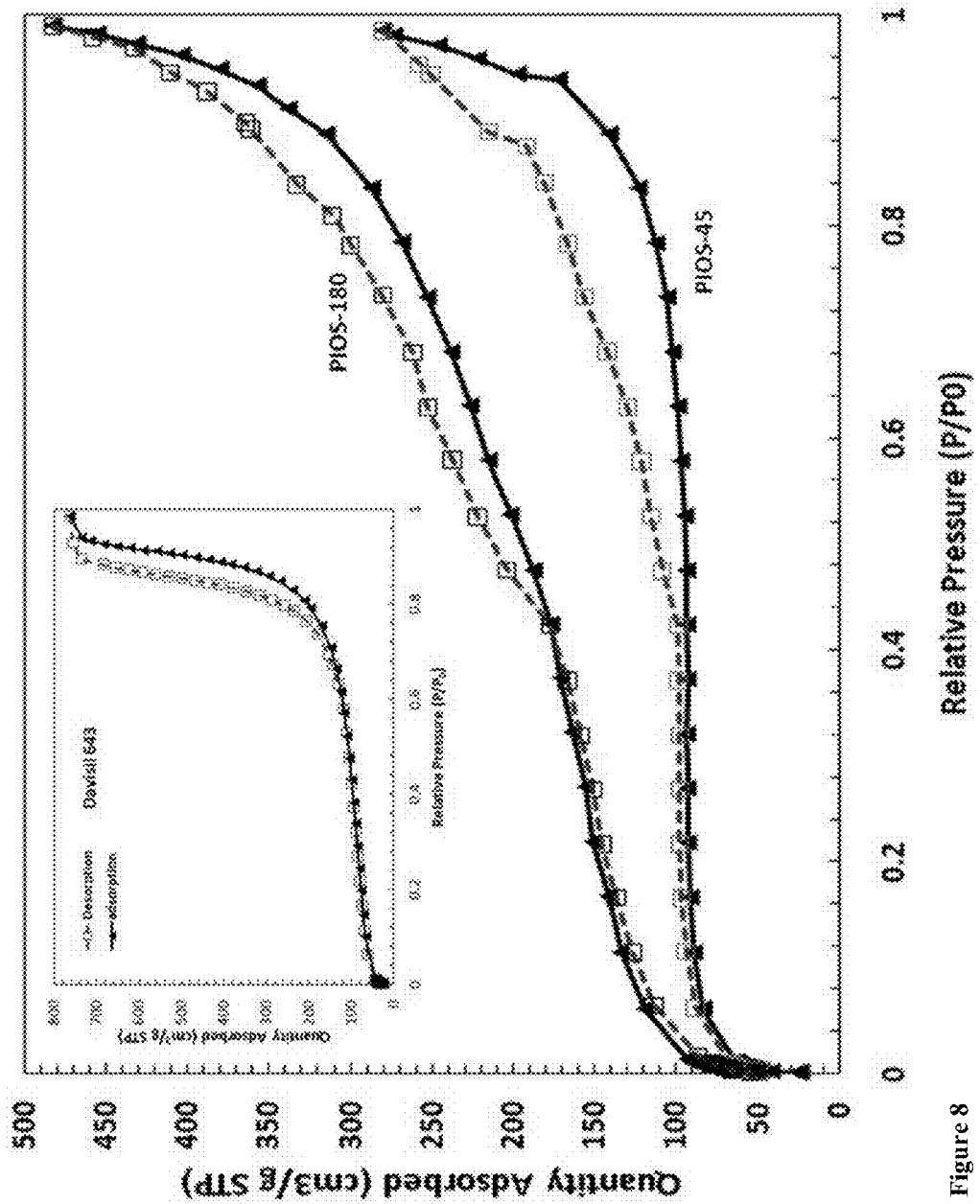
FIG. 8. Representative BET adsorption-desorption isotherms for PIOS particles and commercial silica gel particles (inset).

FIG. 8 shows the nitrogen adsorption-desorption isotherms of two PIOS samples and Davisil 643 silica gel particles at 77 K. PIOS-45 is the sample taken after 45 minutes of polymerization. The isotherms for both PIOS particles showed no limiting adsorption at high $P/P_0$ and the physisorption isotherm exhibits H3-type hysteresis, as defined by the IUPAC. The adsorption-desorption isotherms of PIOS particles were different from those of commercial silica particles (Davisil 643) that exhibit a type-IV $N_2$ adsorption-desorption isotherm with H1-type hysteresis loop.

Figure 9:
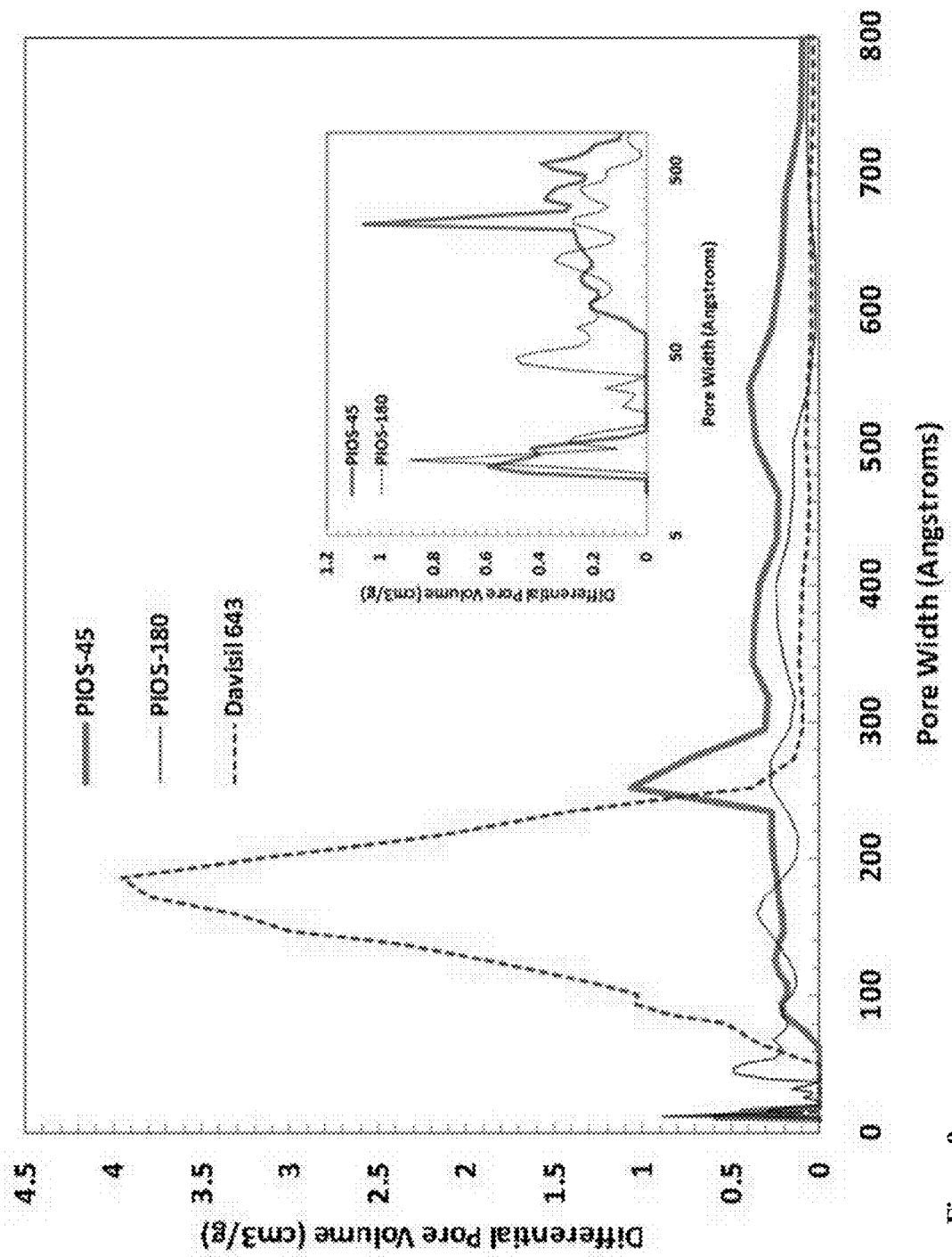
FIG. 9. Representative pore size distribution of PIOS particles and commercial silica particles.

The pore size distributions (PSD), obtained from the adsorption-desorption data using the Barrett-Joyner-Halenda (BJH) procedure, are shown in FIG. 9 for the three silica samples tested in this example. In general, internal surface of a porous silica particle comprises the walls of all cracks, pores and cavities. The pore size distributions of PIOS particles shown in FIG. 9 (and inset) indicate that they contained mesopores as well as larger macropores that are quite broadly distributed from about 10 nm to about 70 nm whereas conventional commercial silica particles have a narrow pore size distribution between 5-28 nm.

The differences in adsorption-desorption isotherms and pore size distributions between PIOS and commercial silica particles can be understood the structure of these materials was considered. In the synthesis of commercial silica particles, 10~50 nm-diameter spheroids or primary particles were first formed during the polymerization of silicic acid solution. These spheroids aggregates to 0.2-0.5 µm-diameter clusters. The channels between the primary particles and those between the clusters were void pores. In the PIOS synthesized in this example, silica was formed at the surface of sub-grains of polymer particles and in the interstices between these polymer particles. The void space was formed as the polymer is removed by pyrolysis (see FIG. 4d). In other words, pores or void spaces in PIOS particles were formed by different mechanisms from conventional silica particles. It is expected that the wide open and interconnected structure of the pores in PIOS particles may offer some unique applications because they may provide an easy access of large reactive molecules for adsorption and/or reaction.

TABLE 1

Properties of silica particles.

| Property | PIOS-180 | PIOS-45 | Commercial silica |
|---|---|---|---|
| MMA polymerization time (h) | 180 | 45 | n.a. |
| Polymerization temperature (° C.) | 70 | 70 | n.a. |
| BET surface area (m²/g) | 523.86 | 285.81 | 272.17 |
| Average pore diameter[a] (nm) | 8.83 | 22.17 | 16.06 |
| Pore volume (cm³/g) | 0.747 | 0.433 | 1.180 |
| SiO₂/PMMA (g/g) | 0.127 | 0.178 | — |

[a]BJH adsorption average pore diameter.

Table 1 compares the physical properties of the PIOS particles with those of commercial silica gel Davisil 643. Assuming that PIOS can be roughly represented by a regular arrangement of concentric layers of hollow spheres of about 1.5 µm in diameter and 100 nm wall-thickness self-contained in a sphere of 30-100 µm of internal diameter, the estimated specific surface area varies between 270 and 300 $m^2/g$. This result agrees quite well with the BET surface area measured for PIOS-180 and PIOS-45 (see Table 1). The same geometric model was used to roughly estimate the porosity of PIOS ($\sim V_{void}/V_{total}$), and it resulted 0.80. The silica/PMMA ratio was calculated based on the weight of samples before and after the calcination. The particle samples were completely dried before the calcination.

Example 3

This example describes the polymerization of ethylene with rac-Et(1-indenyl)$_2$ZrCl$_2$/MAO (methylaluminoxane) (EBI) catalyst supported on ultraporous and spherical pseudo-inverse opal silica (PIOS) particles with unique morphology. The novel silica particles with an inverse opal-like structure provide offer wide-open pore and surface structures favorable for the catalyst deposition and monomer access with minimal intraparticle diffusion resistance. The metallocene catalyst supported on the PIOS support exhibited very high initial catalyst activity and longer catalyst life time compared with conventional silica-supported catalysts. The experimental data that show the effects of support geometry on the catalytic activity, catalyst particle fragmentation, polymer particle morphology, and polymer molecular weight distribution in ethylene polymerization are presented. The unique morphology of the PIOS particles and the performance of the PIOS-supported catalyst are presented and compared with conventional silica-supported catalysts.

Materials. Polymerization grade ethylene (Air products) was purified by passing through a stainless steel column packed with R3-11 Cu catalyst, 4 Å molecular sieves, neutral alumina and activated carbon. Toluene (Aldrich) was purified by being refluxed over sodium and benzophenone in nitrogen atmosphere. Rac-Et (1-indenyl)$_2$ZrCl$_2$ catalyst (EBI, Aldrich) and methylaluminoxane solution (MAO, Aldrich, 10 wt. % in toluene) were used without further purification. There are many different silica gels commercially available for supporting metallocene catalysts. These commercial silicas offer different pore structure, surface area, and particle size distribution. In this example, two commercial silica supports (Davisil 643 (BET surface area 272.17 m²/g), Sylopol 948

(BET surface area 295.0 m²/g, W.R. Grace) that are widely used to support metallocene catalysts for α-olefin polymerization were used. The main silica support material used in this example was the pseudo-inverse opal silica (PIOS).

Figure 10:
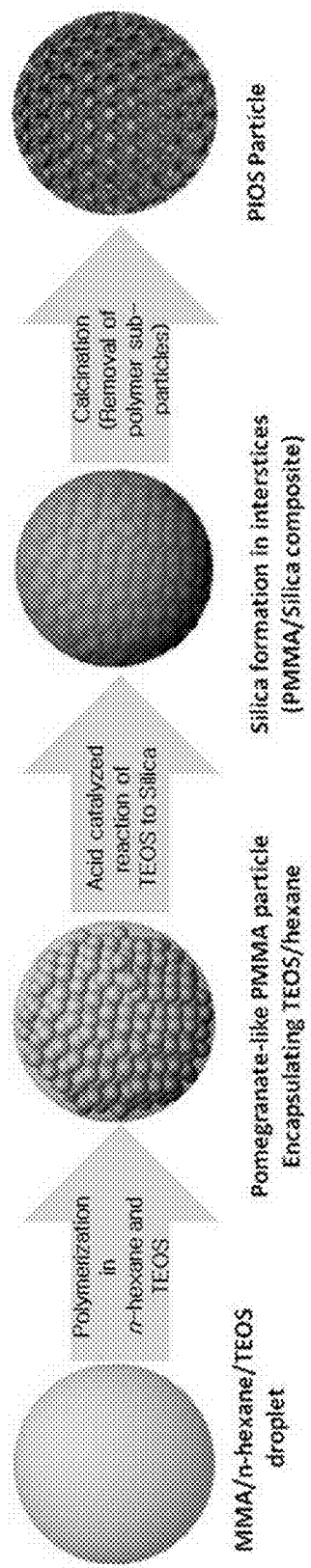
FIG. 10. An example of a (a): Synthetic procedure of PIOS particles using pomegranate-like PMMA particles as templates; (b) and (c) are SEM images of PIOS particles.
Figure 10:
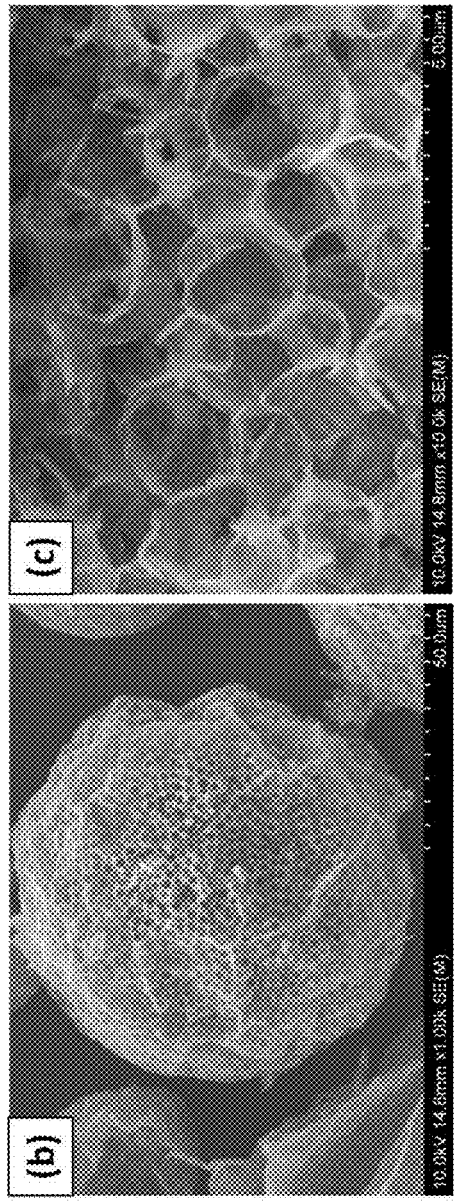

Preparation of PIOS particles. Inverse opals are the three-dimensionally ordered macro porous materials and they are inverse replicates of opals consisting of regularly arranged and uniformly sized spherical void spaces of a few hundred nanometers in diameter surrounded by thin solid walls. Micrometer-sized (30-100 μm) spherical silica particles (PIOS particles) that have a pseudo-inverse opal structure have unique morphological characteristics. Here, each PIOS micro-particle is packed with 0.5-1.5 μm-diameter "hollow" silica sub-particles that resemble the aggregates of egg shells. These silica sub-particles are packed densely and interconnected. However, they are not packed in a geometrically perfect hexagonal array and hence, it is called the pseudo inverse opal silica. PIOS particles are synthesized using polymer particle templates, pomegranate-like poly(methyl methacrylate) (PMMA) particles. The template polymer particles were synthesized by a modified suspension polymerization called micro-dispersive suspension polymerization where sub-particle nucleation and growth are induced by controlling the thermodynamic solution conditions within suspended monomer/solvent droplets. The typical synthesis process for PIOS particles is illustrated in FIG. 10($a$). Here, a three step preparation procedure involves (i) the synthesis of unique pomegranate-like micro-particle templates containing a silica precursor ($SiC_8H_{20}O_4$, tetraethyl orthosilicate; TEOS) by modified suspension polymerization, (ii) the impregnation of the polymer micro-particles with a sol-gel catalyst to induce the hydrolysis/condensation of TEOS within polymer micro-particles, and (iii) the selective removal of the polymer by pyrolysis to obtain PIOS particles. The synthesis of template micro-particles is briefly summarized as follows: an organic phase containing 48 wt. % of monomer (MMA), 20.0 wt. % of n-hexane, 30.0 wt. % of TEOS, 0.7 wt. % of methacryloxypropyl-terminated polydimethyl siloxane (PDMS) and 1.3 wt. % of lauroyl peroxide was suspended in an aqueous phase by mechanical agitation. The organic droplets (10-150 μm) were stabilized by a small amount of partially hydrolyzed poly(vinyl alcohol) dissolved in the aqueous phase (89% hydrolyzed, MW=85,000-124,000 g/mol). The initial composition of MMA-n-hexane mixture is chosen such that the PMMA produced precipitates in the liquid phase within suspended droplets. During the polymerization, polymer particles precipitate out from the liquid phase within suspended droplets. The final polymer particle of 20-50 μm with a pericellular membrane ('skin') packed with 1-2 μm sub-particles has a morphology resembling a pomegranate.

FIGS. 10($b$) and 10($c$) show the scanning electron microscopic (SEM, Hitachi S-4700) images of the PIOS particle morphologies prepared by the three-stage process. The thin transparent surface layer in FIG. 10($b$) is the silica present in the shell section of a polymer template particle. From the magnified view of the PIOS particle as shown in FIG. 10($c$), the PIOS particle has very different morphology from conventional silica particles and they resembles the aggregates of egg shell-like pseudo inverse opals. The BET surface area measured using Micrometrics ASAP2020 apparatus at 77K was 523.86 m²/g and the pore size distribution was measured using the Barrett-Joyner-Halenda (BJH) method. The surface area of the PIOS particles is about 78-93% larger than the two commercial silica samples employed in this example. The PIOS particles as well as commercial silica particles were completely amorphous as confirmed by the X-ray diffraction (XRD) patterns.

Preparation of supported catalysts. Silica-supported EBI catalysts were prepared as follows. A known amount of silica support particles were calcined at 250° C. before they were soaked in a piranha solution (30% hydrogen peroxide and 70% sulfuric acid) for 30 minutes, washed with excess amount of deionized water, and then treated with an MAO solution (10 wt. % in toluene) at ambient temperature for 24 hours. The MAO-treated silica particles were washed with toluene, and dried in vacuo overnight. Then, the silica support was immersed in the EBI catalyst/toluene solution for 24 hr, washed with toluene several times, and dried in vacuo overnight.

Polymerization. A liquid slurry ethylene polymerization was carried out in a 500 mL glass reactor equipped with a mechanical agitator. Predetermined amounts of toluene (300 mL), MAO solution (4 mL), and silica-supported EBI catalyst (40-50 mg) were charged into a reactor assembly in an argon-filled glove box. The concentration of MAO in the reactor was 0.02 mol/L in all the experiments. The reactor assembly was removed from the glove box and was immersed in a constant temperature bath at 70° C. and connected to an ethylene supply line. The reactor pressure was raised and set at 2.07 bar by pure ethylene gas. The equilibrium ethylene concentration in toluene calculated by Henry-Gesetz equation was 0.0157 mol/L. The reactor pressure (i.e., ethylene pressure) was kept constant by supplying ethylene on demand automatically with a pressure controller. The ethylene flow rate to the reactor (mL/min), which corresponds to the polymerization rate for a given mass of supported catalyst, was monitored by an in-line mass flow meter during the polymerization experiment. The ethylene mass flow rate, reactor temperature, and reactor pressure data were recorded onto an on-line data acquisition computer. The recorded polymerization rate (i.e., ethylene flow rate) was numerically integrated with time to obtain the polymer yield data. The calculated yield and actually measured yield values agreed quite well within ±7~9%. Some loss of very fine samples might have occurred during the sample collection process (separation and drying). After polymerization, the reaction mixture was filtered, washed with acidified methanol and dried in vacuo overnight. The morphology of polymer particles and support silica materials were analyzed by scanning electron microscopy (SEM, Hitachi S-4700). The sample particles were coated with carbon layers in a Denton DV-503 vacuum evaporator. The molecular weight distribution was measured by gel permeation chromatography (Polymer Laboratories) using 1,2,3-trichlorobenzene at 160° C. with PLgel® 10 μm MIXED-B and PLgel® 10 μm GUARD columns.

Figure 11:
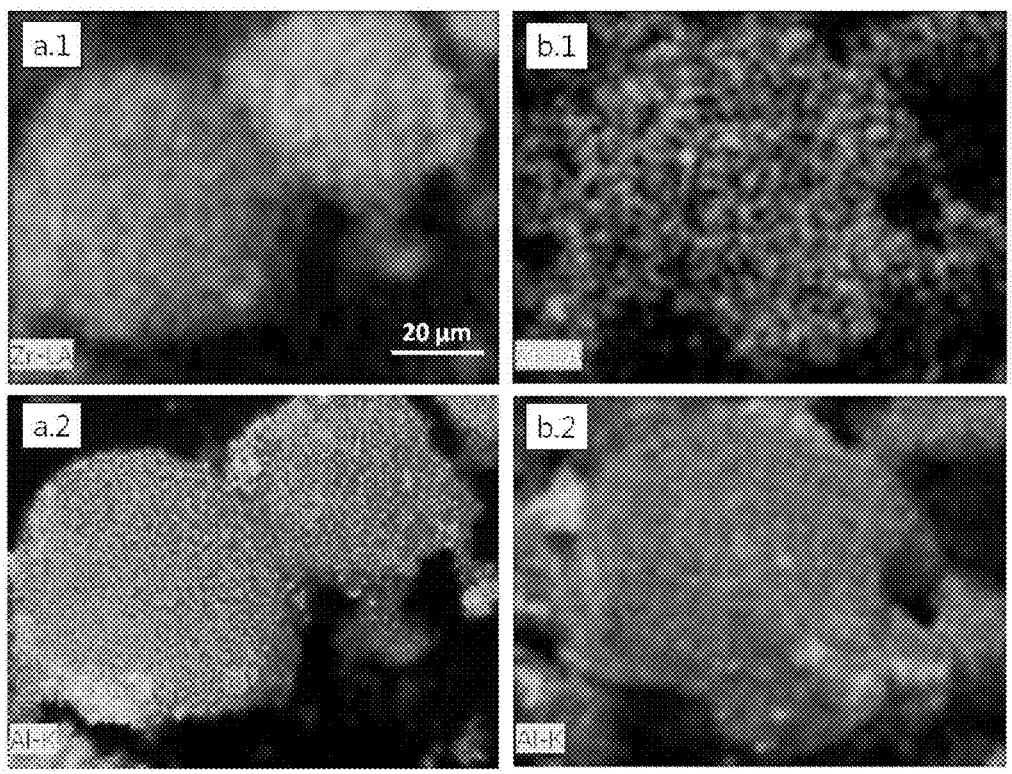
FIG. 11. Representative EDX element mappings (zirconium and aluminum) of EBI catalyst supported on PIOS particles (a.1 and a.2) and Davisil 643 particles (b.1 and b.2) (lighter parts indicate metal atoms) (scale bar applies to all images).

Silica properties and catalyst distribution. The Zr contents in the supported EBI catalyst were measured by inductively coupled plasma mass spectrometry (ICP-OES, ACTIVA, JY HORIVA) and they were: $6.40 \times 10^{-5}$ mol-Zr/g for PIOS, $2.82 \times 10^{-5}$ mol-Zr/g for Davisil 643, and $1.88 \times 10^{-5}$ mol-Zr/g for Sylopol 948. High concentration of Zr per gram of PIOS is due to its large specific surface area that is approximately twice that of typical commercial silica. The Zr contents per unit surface area for each catalyst were similar: $1.22 \times 10^{-7}$ mol-Zr/m² for PIOS/EBI catalyst, $1.037 \times 10^{-7}$ mol-Zr/m² for Davisil 643/EBI catalyst, and $0.637 \times 10^{-7}$ mol-Zr/m² for Sylopol 948/EBI catalyst. Davisil 643 silica particles are irregularly shaped with particle size of 35-70 μm and Sylopol 948 silica particles are spherical with average particle size of 60 μm. The average diameter of PIOS particles is about 50 μm. In each experiment, 6.03 mmole of Al (MAO) was used in 300 mL toluene solution. The area distribution of EBI catalyst components on PIOS particles was measured by energy-dispersive X-ray spectroscopic analysis (EDX/EDS, EDAX (Ametek) attached to AMRAY-1610). FIG. 11(a.1, a.2) shows the EDX element mapping images of the PIOS-supported EBI catalyst surface. It is seen that both zirconium and aluminum (lighter parts in the photos) are quite homogeneously dispersed in the PIOS particle (Zr, 6.97 Atom %; Al, 21.38 Atom %; Cl, 5.55 Atom %; Si, 65.49 Atom %). The EDX element mapping images of the Davisil 643-supported EBI catalyst surface illustrated in FIG. 11(b.1, b.2) also show that both zirconium and aluminum are uniformly dispersed. It is interesting to observe that the availability of larger open surface of PIOS particles than conventional silica particles for catalyst deposition is seen by higher density of deposited metal atoms indicated by higher contrast intensities in panels a.1 and a.2 than in panels b.1 and b.2.

Figure 12:
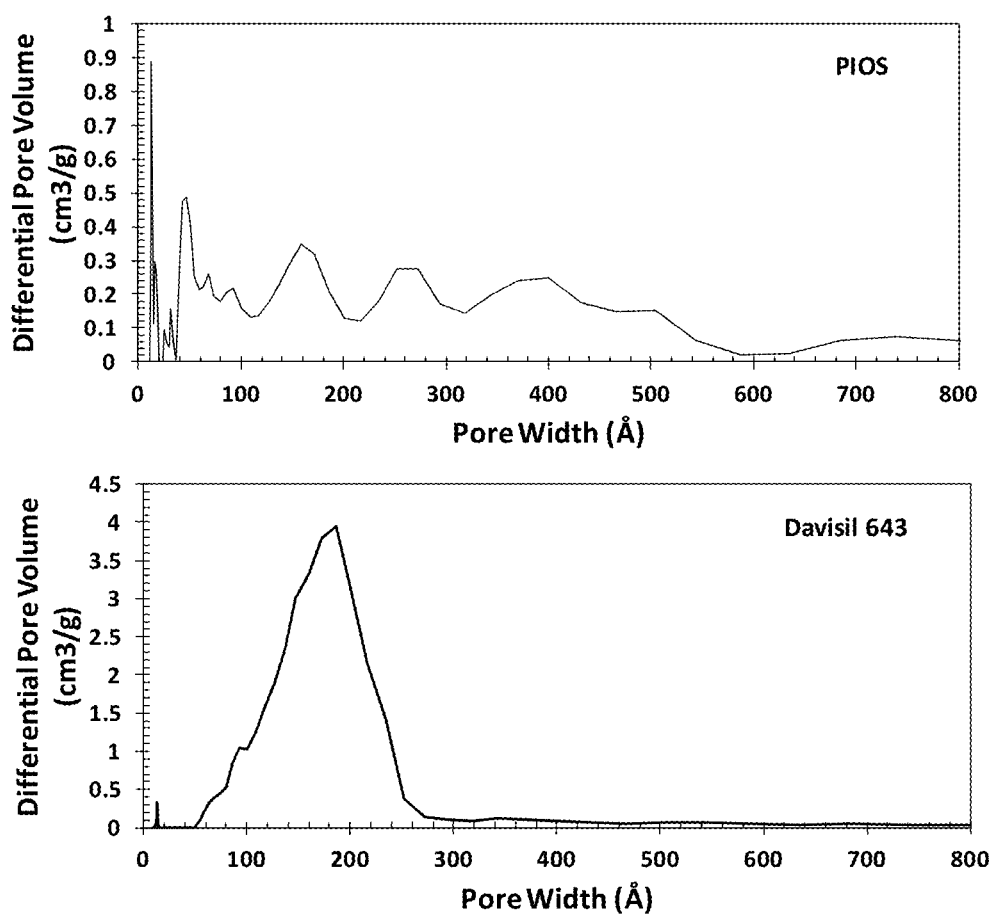
FIG. 12. Representative pore size distributions of PIOS and conventional silica particles (Davisil 643).

The pore size distributions, obtained from the adsorption-desorption data using the Barrett-Joyner-Halenda (BJH) procedure, are shown in FIG. 12 for PIOS and conventional silica particles (Davisil 643). In general, internal surface of a porous silica particle comprises the walls of all cracks, pores and cavities. The pore size distribution of PIOS particles shown in FIG. 12 indicates that PIOS particles contain mesopores as well as larger macro-pores that are quite broadly distributed from about 10 nm to about 80 nm whereas conventional commercial silica particles have a narrow pore size distribution between 5-28 nm. In the synthesis of commercial silica particles, 10-50 nm-diameter spheroids or primary particles were first formed during the polymerization of silicic acid solution. These spheroids aggregate to 0.2-0.5 μm-diameter clusters and the channels between the primary particles and those between the clusters are pores. In the PIOS, silica is formed at the surface of sub-polymer particles and in the interstices between these sub-particles formed within a suspended monomer/solvent droplet. The void space was formed as the polymer sub-particles are removed by pyrolysis. The difference in the pore-forming mechanisms between PIOS and conventional silica particles is the primary reason for the difference in pore size distributions that are illustrated in FIG. 12.

Catalyst activity. Catalyst activity or polymerization rate (g/g-cat·min or g/mol-Zr·min) is the most important performance measure of a polymerization catalyst. Here, it is noted that the reported catalyst activity is typically a time-averaged polymerization rate obtained by dividing a polymer yield by reaction time. If a catalyst exhibits rapid activity decay with time, the calculated value of time-averaged polymerization rate becomes strongly dependent on the reaction time that is used to divide the overall polymer yield. The choice of reaction time for the calculation of average reaction rate using polymer yield data can be arbitrary and this could be one of the reasons why some inconsistent average activity data are often reported in literature for a same catalyst compound. In this example, complete time-dependent polymerization rate profiles or instantaneous ethylene consumption rate profiles (i.e., ethylene polymerization rates) were measured using an in-line mass flow meter with an on-line data acquisition system for each supported EBI catalyst system.

Figure 13:
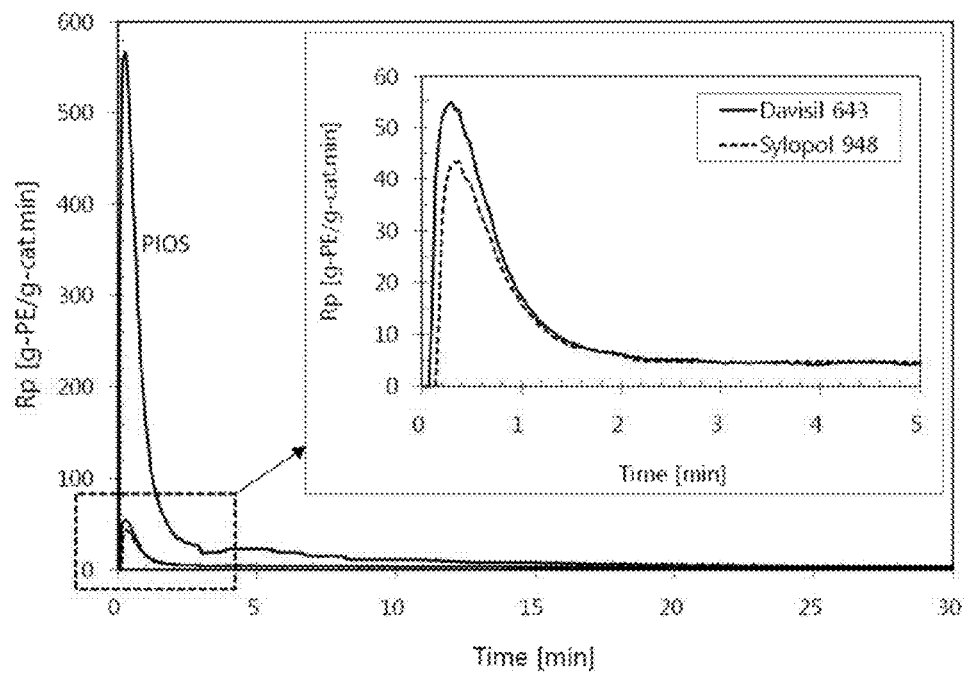
FIG. 13. Representative polymerization rate profiles for three different silica-supported catalysts at 70° C. and 2.07 bar.

FIG. 13 shows the ethylene polymerization rate profiles directly measured for three different silica-supported EBI catalysts at 70° C. and 2.07 bar of ethylene partial pressure. All three supported catalysts exhibit decay-type kinetic profiles where the polymerization rate rises rapidly to a maximum and then declines with reaction time were observed. In many silica-supported metallocene or chromium oxide catalysts for ethylene polymerization, it has been reported that polymerization rate profiles can exhibit induction period, followed by a gradual rate increase with time. In such cases, the induction period was attributed to the formation of dense outer layer of polymer that severely hinders the diffusion of monomer until dense silica-polymer layer disintegrates to permit the penetration of monomer into the particle interior. Secondly, the initial maximum polymerization rate with PIOS-supported catalyst is about 10 times higher than the two conventional silica-supported catalysts that show almost identical kinetic profiles. Also, it is interesting to observe that the polymerization activity of the PIOS-supported catalyst maintains its steady rate after about 3 minutes and its level of activity is much higher than the silica-supported catalysts. The stationary activity for the silica-supported catalysts (inset) corresponds to about 70 kg/mol-Zr·min, which is quite comparable to the reported values.

Figure 14:
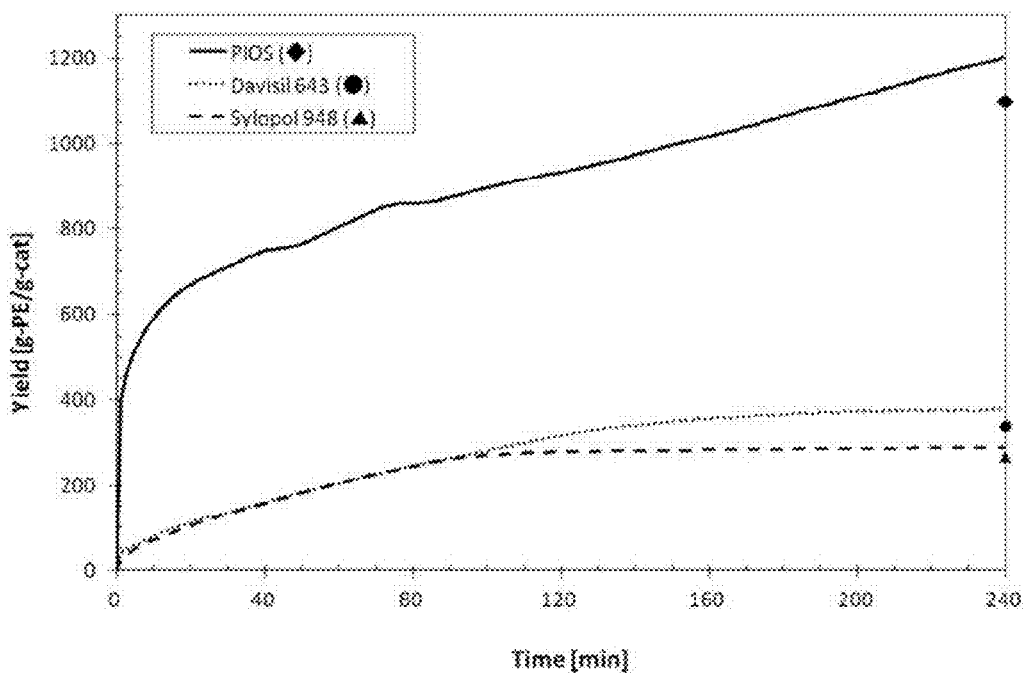
FIG. 14. Representative ethylene polymerization at 70° C. and 2.07 bar with EBI catalyst on three different silica supports. Symbols represent actual yield measurements.
Figure 15:
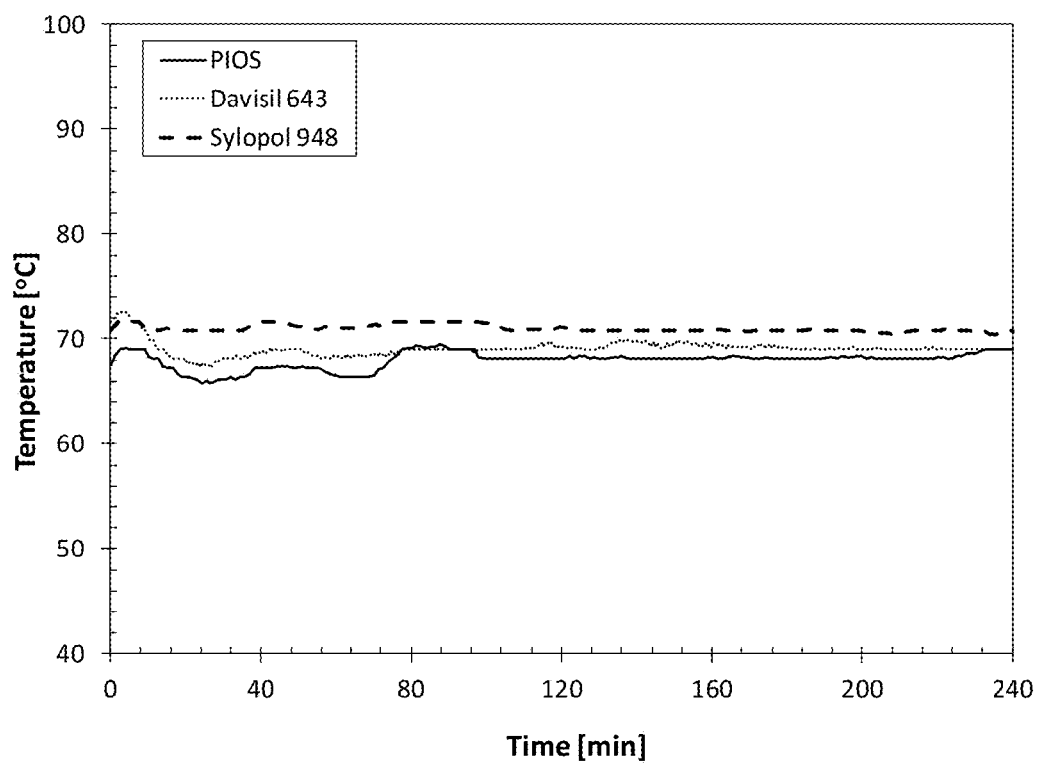
FIG. 15. Representative reaction temperature profiles in semibatch ethylene polymerization experiments in a 500 mL agitated reactor.

The polymer yields per gram of catalyst with reaction time for these catalysts are shown in FIG. 14. The yield data were obtained by integrating the polymerization rate (ethylene consumption rate) vs. time profiles (FIG. 13). The symbols indicate actual yield measurements. FIG. 14 show that the cumulative yield of polyethylene (g-PE/g-cat) obtained with PIOS-supported EBI catalyst is several times higher than the commercial silica-supported catalyst. The performances of the two commercial silica-supported catalysts (dotted lines) show similar yield profiles. It has also been observed that the yield reaches a stationary value at about 90-120 minutes for commercial silica systems whereas the PIOS-supported catalyst system shows continuous increase in polymer yield. It was observed in the experiments that the high initial reaction rates illustrated in FIG. 13 did not cause significant exotherms. FIG. 15 illustrates the actual reactor temperature profiles during the polymerization. It is seen that some deviations from the target reaction temperature of 70° C. are present but not to a significant level to affect the measured polymerization rate. The relatively constant reactor temperature even with high initial catalyst activity was because the reaction generated by a small amount of PIOS-supported catalyst (0.013 g/L) suspended in toluene was quite small.

Polymerization rate analysis. In FIGS. 13 and 14, it is illustrated that the catalytic performance of the PIOS-supported EBI catalyst differs from that of silica particle-supported catalysts. For further analysis of the observed polymerization kinetics, consider the polymerization rate $\tilde{R}_p$ (g/gcat·min) that can be expressed in a general form as $$\tilde{R}_p = k_p [M]_p f([Zr]) w_m \quad (1)$$

where $k_p$ is the propagation rate constant (L/mol·min), $[M]_p$ is the monomer concentration (mol/L) at the catalytic site, $w_m$ is the molecular weight of monomer (g/mol), [Zr] is the active catalyst site concentration (mol-Zr/g-cat). Here, the concentration of active catalytic sites available for the polymerization is dependent on many factors such as catalyst preparation procedure, uniformity of complexation of zirconium site with MAO, silica morphology, pore surface properties of silica, particle disintegration, etc. Because of such empirical factors, it is practically difficult to know exact concentration of catalyst sites available for polymerization. Thus, in Eq. (1), the active catalyst site concentration is expressed in a functional form (i.e., $f([Zr])$). The intrinsic catalyst activity is also affected by catalytic site deactivation and monomer diffusion resistance because of the heterogeneous nature of the polymerization. The monomer concentration in the solid phase, $[M]_p$, is generally affected by intraparticle diffusion resistance and it can be approximated as $[M]_p = \eta [M]_b$ where $[M]_b$ is the bulk phase monomer concentration and $\eta$ is the effectiveness factor ($\eta \le 1.0$) that represents the monomer diffusion effect in the particle. Since not all the zirconium sites may be catalytically active for ethylene polymerization and also the activity may change with time, a new parameter called the catalyst activity parameter (ψ) is defined to account for the catalyst efficiency with the initial zirconium loading as a basis. For example, assume that the site activity function is approximated by $f([Zr])=\psi[Zr]_0$ where $[Zr]_0$ is the initial zirconium concentration on the silica support surface. If ψ=1.0, then all the initial zirconium sites will be available for polymerization. In practice, the exact value of this parameter will be difficult to measure but it will be reasonable to assume that ψ value is smaller than 1.0 due to poisoning by impurities, incomplete complexation with MAO, etc. Here, both η and ψ are the empirical parameters because they are difficult to directly measure experimentally. Then, Eq. (1) can be recast into the following form using these new parameters:

$$\tilde{R}_p = k_p(\eta[M]_b)(\psi[Zr]_0)w_m \quad (2)$$

The exact cause of catalytic activity decay is not fully understood but it is generally modeled by the first-order decay kinetics. Then, Eq. (2) can be written as $$\tilde{R}_p = k_p(\eta[M]_b)(\psi_0[Zr]_0 e^{-k_d t})w_m \quad (3)$$

where $k_d$ is the deactivation rate constant and $\psi_0$ is the initial catalyst activity parameter.

The polymerization rate can also be expressed in g/mol-Ti·min (i.e., $R_p = \tilde{R}_p/[Zr]_0$). Then, from Eq. (3), the initial polymerization rate (i.e., at t=0) in g/mol-Zr·min can be expressed as $$R_{p0} \equiv \frac{\tilde{R}_{p0}}{[Zr]_0} = \eta_0\psi_0 k_p[M]_b w_m \quad (4)$$

where $\eta_0$ is the initial effectiveness factor $$\left(\text{i.e., } \eta_0 = \lim_{t \to 0} \eta\right).$$

For the experimental conditions used in this example, the monomer concentration remains nearly constant because ethylene partial pressure was kept constant during the polymerization. The polymerization rate (g/mol-Ti·min) in Eq. (4) is normalized with initial polymerization rate, the following equation is obtained:

$$\frac{R_p}{R_{p0}} = \frac{\eta\psi}{\eta_0\psi_0}\exp(-k_d t) \equiv \frac{\eta'}{\eta_0'}\exp(-k_d t) \quad (5)$$

where $\eta'(=\eta\psi)$ and $\eta_0'(=\eta_0\psi_0)$ represent the overall effectiveness factors at time t and time zero. Equation (5) can be rearranged to $$-\ln\frac{R_p}{R_{p0}} = \ln\frac{\eta_0'}{\eta'} + k_d t \quad (6)$$

Figure 16:
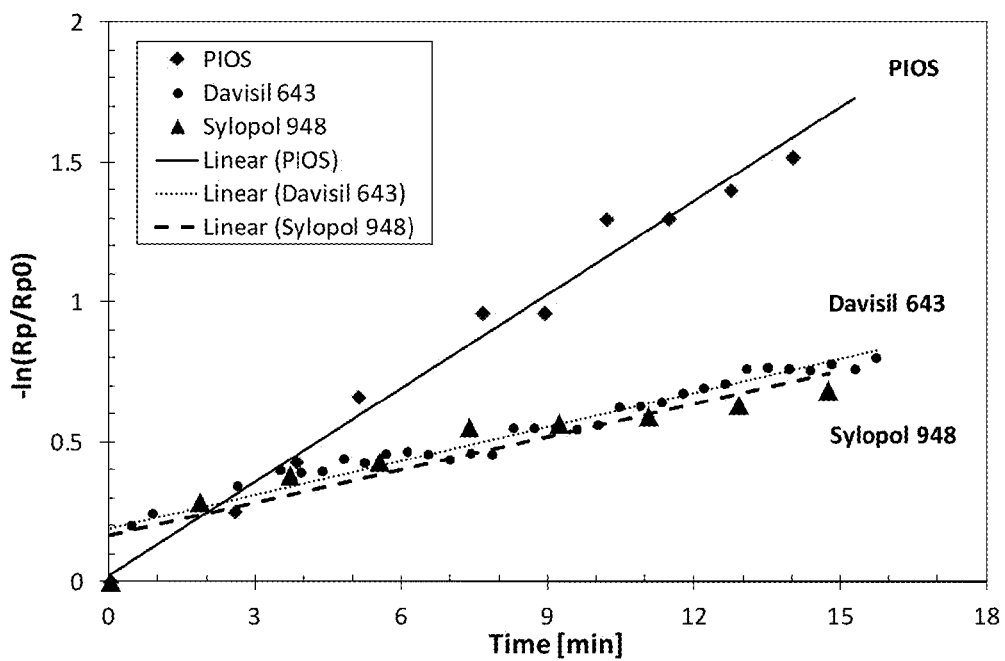
FIG. 16. Plot of eq. (6).

FIG. 16 shows the plots of eq. (6) for three supported catalyst systems over the first 15-16 minutes reaction time. For both conventional silica-supported catalysts, the rate data are well fitted by Eq. (6) and from the intercept (t→0), $\eta'/\eta_0'=0.828$ is obtained. This value indicates that the mass transfer resistance and/or unavailability of all the catalytic sites might have affected the polymerization from the beginning of polymerization. On the other hand, the PIOS-supported catalyst shows that the intercept is zero (i.e., $\eta'\approx\eta_0'$), which suggests that the effects of particle fragmentation and physical transport resistance on the reaction kinetics were minimal. Here, it is pointed out that the effectiveness factor can change with reaction time because of time-varying particle size and active site concentrations. However, in the above analysis, the effectiveness factor was assumed to be constant during the polymerization. Even with this simplifying assumption, FIG. 16 clearly shows the different kinetic behavior between the PIOS-supported catalyst and the conventional silica particle-supported catalyst under same reaction conditions.

The deactivation parameter values ($k_d$) estimated from the slope of each straight line in FIG. 16 are 0.04 min$^{-1}$ for the two conventional silica-supported EBI catalysts and 0.112 min$^{-1}$ for the PIOS-supported catalyst. The decay constant for the PIOS supported catalyst is larger than the conventional catalysts but as seen in FIG. 13, the polymerization rate over PIOS-supported catalyst maintained much higher value than the conventional silica-supported catalysts over extended period of reaction time. The activity decay modeled as a first-order process in the above analysis is a simplification of a possibly much more complex deactivation mechanism. The activity decay is known to be caused by many factors that are not very well understood. For example, the activity decay can be due to the loss of intrinsic catalytic activity by some unknown side reactions or due to delayed exposure of active sites during the polymerization. Since most of the active sites in PIOS-supported catalyst are believed to be exposed from the beginning of polymerization, the estimated decay constant obtained from FIG. 16 might be close to its intrinsic value. However, with conventional silica-supported catalysts, very slow or often incomplete silica fragmentation can result in low polymerization rates and hence smaller apparent decay constant value. In other words, the slope of the fitting lines for the conventional silica-supported catalysts in FIG. 16 represents an approximate or apparent decay constant value.

Figure 17:
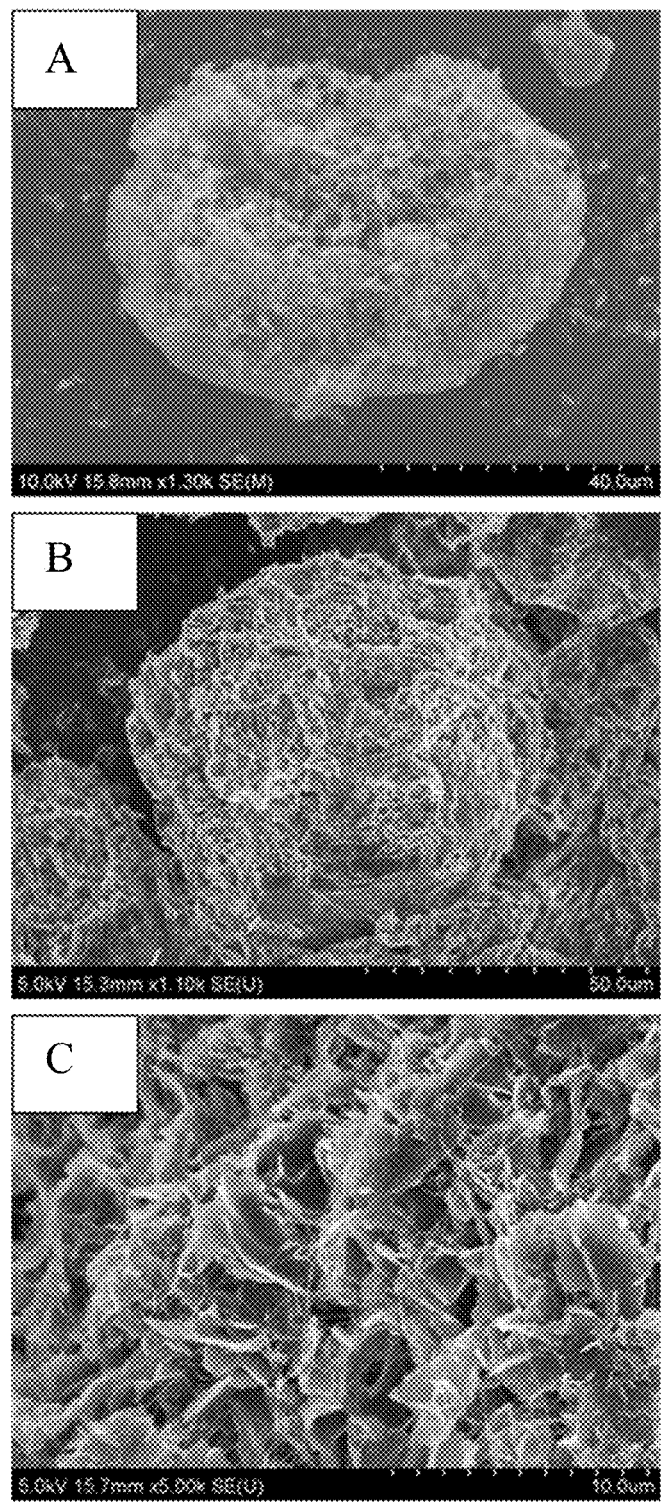
FIG. 17. Representative polyethylene particle morphologies: (A) catalyst impregnated PIOS particle before polymerization, (B) polymer with PIOS-support catalyst after 7 minutes, (C) details of (B).
Figure 18:
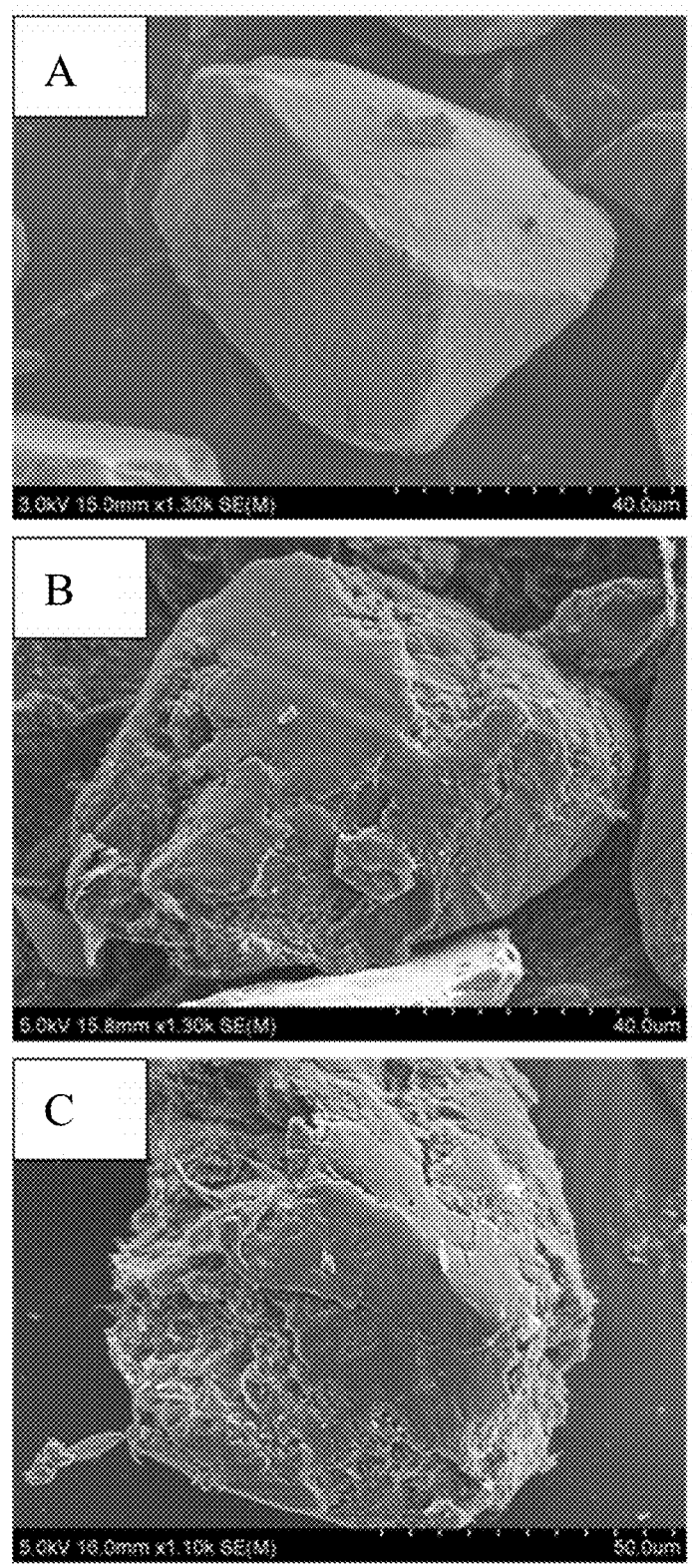
FIG. 18. Representative polyethylene particle morphologies: (A) catalyst impregnated Davisil 643 particle before polymerization, (B) polymer with Davisil 643 at 10 minutes, (C) polymer with Davisil 643 at 20 minutes.
Figure 19:
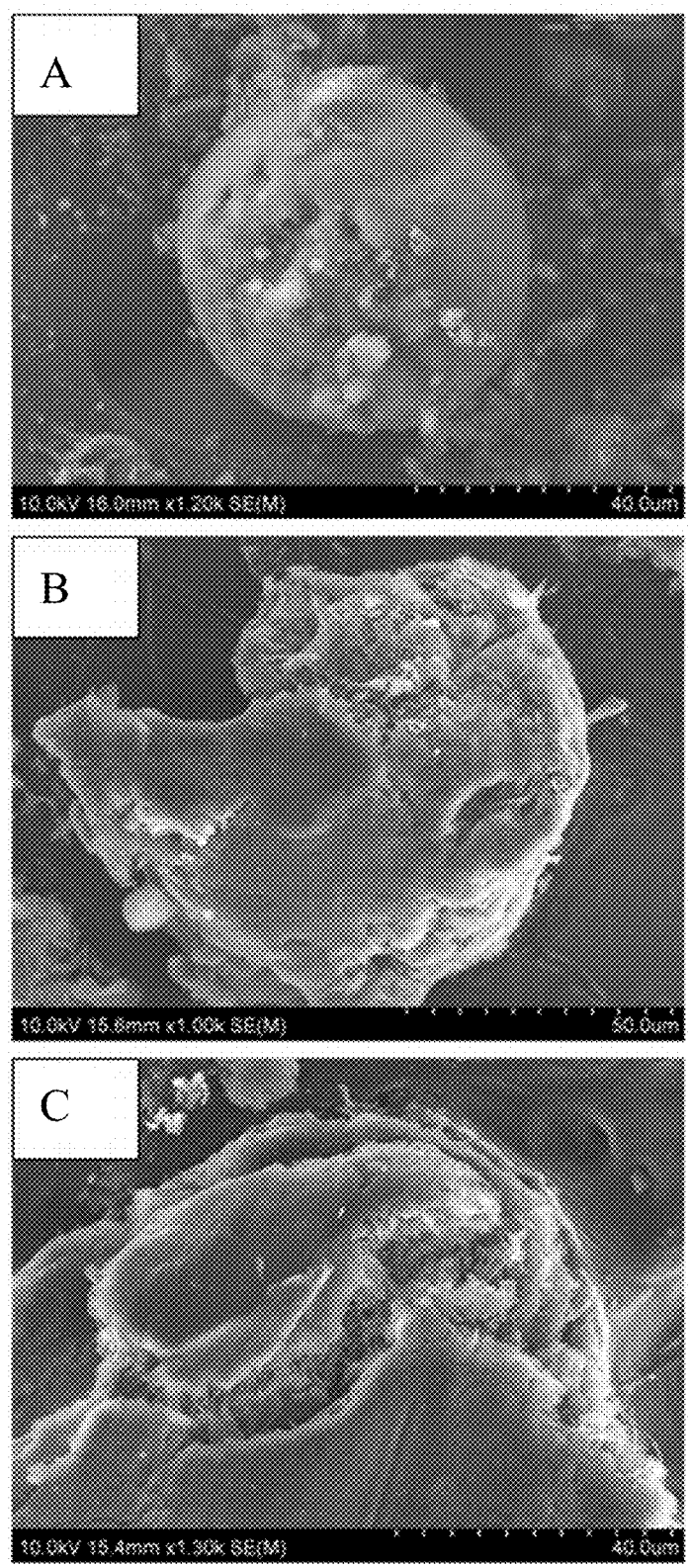
FIG. 19. Representative polyethylene particle morphologies: (A) catalyst impregnated Sylopol 948 particle before polymerization, (B) polymer with Sylopol 948 at 10 minutes, (C) polymer with Sylopol 948 at 20 minutes.

Polymer particle morphology. The analysis of polymer particle morphology during the early period of polymerization provides useful information about the differences in catalytic activity observed for the supported catalyst systems tested in this example. FIGS. 17-19 show the SEM images of polyethylene particles obtained using PIOS-supported catalyst and commercial silica-supported catalyst (Davisil 643 and Sylopol 948). The (A) panels in FIGS. 17-19 show the catalyst-loaded PIOS and silica particles before polymerization. The morphologies of polymer particles after 7 minutes with PIOS particles are shown in FIGS. 17(A) and (B). Notice that polymerization has already progressed in the entire PIOS-supported particle. In contrast, only partial fragmentation is observed with Davisil 643 and Sylopol 948-supported catalyst after 10-20 minutes (FIGS. 18(B) and (C); FIGS. 19(B) and (C), indicating that commercial silica particles are quite resistant to fragmentation whereas the PIOS-supported particle shows a nearly full fragmentation from the beginning of polymerization. It is believed this difference in the particle morphology during the polymerization is a primary reason for the difference in catalytic activity as illustrated in FIGS. 13-16. In other words, the PIOS-supported catalyst starts the polymerization with its wide open structure from the beginning of polymerization with minimal resistance to silica fragmentation as polymerization progresses. The bulk densities of polymer recovered after 4 hours of reaction were 0.156 g/cm$^3$ for a PIOS-supported catalyst and 0.168-0.186 g/cm$^3$ for commercial silica-supported catalysts.

Figure 20:
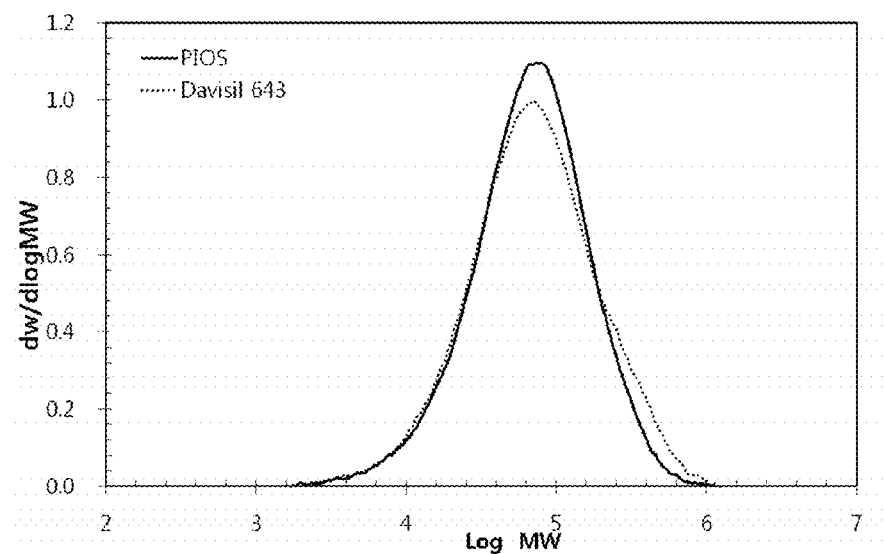
FIG. 20. Representative molecular weight distributions of polyethylenes with PIOS-supported catalyst, and conventional silica-supported catalyst.
Figure 21:
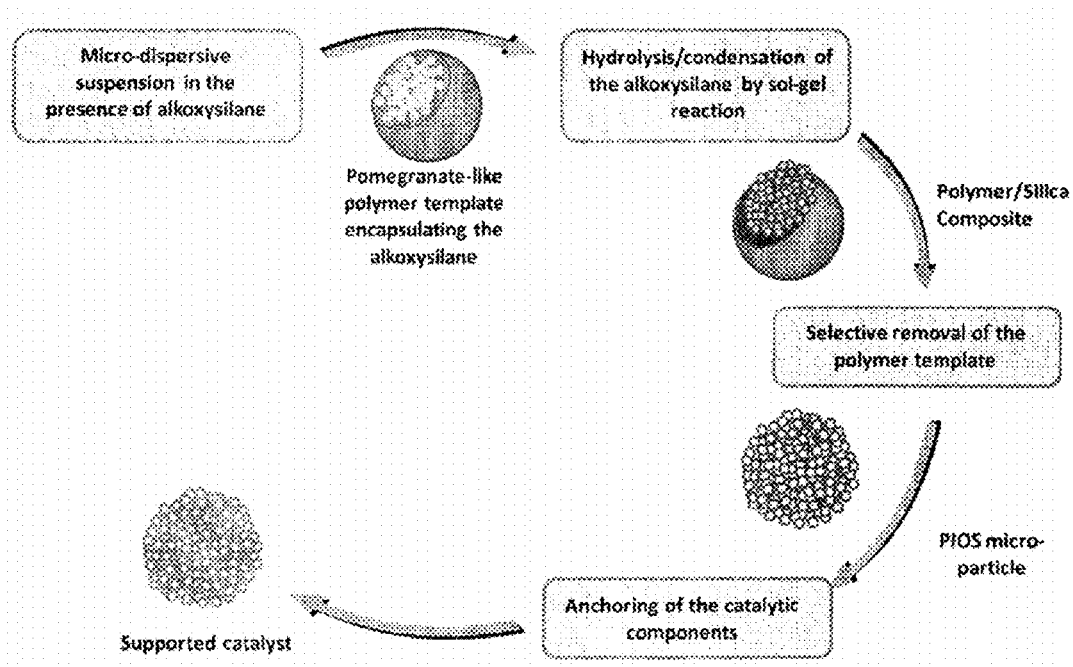
FIG. 21. An example of a schematic representation of the process proposed in this invention.

Polymer molecular weight distribution. It has been generally accepted that any mass transfer limitations in porous heterogeneous olefin polymerization catalysts have minimal effect on polymer molecular weight distribution whereas the catalytic activity is more influenced by the intraparticle monomer mass transfer limitations. Therefore, as expected, the molecular weight properties of polyethylene obtained by PIOS-supported catalyst and commercial silica-supported catalyst were almost identical as illustrated in Table 2 and FIG. 20. It is believed that both polymerization rate and chain transfer rate that dictate the polymer chain length development are enhanced with PIOS-supported catalyst to result in the average molecular weight similar to that of conventional silica-supported catalyst systems. The polydispersity (PDI) values for both supported catalysts indicate some departure from 2. The molecular weight broadening (i.e., departure from the theoretical value of 2.0 for a perfectly single site catalyst) is mostly due to the interactions between the metallocene and the support. For example, a silica support material with surface heterogeneity in hydroxyl group types and concentration may lead to the formation of active sites differing in electronic and steric character. Considering the difficulty in the experimental measurements of MWD by high temperature gel permeation chromatography, the differences in polydispersity values in Table 1 for the tested catalysts seem to be practically insignificant.

TABLE 2

Molecular weight distributions of polyethylene

| Catalyst support | Mn (Dalton) | Mw (Dalton) | PDI |
|---|---|---|---|
| PIOS | 41609 | 95019 | 2.28 |
|  | 38155 | 99870 | 2.62 |
| Davisil 643 | 42212 | 109028 | 2.58 |
|  | 37973 | 100786 | 2.65 |

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A substantially spherical, porous oxide-organic polymer composite microparticle having a longest linear dimension of 1 micron to 2 millimeters, the microparticle having a polymer shell, and a plurality of discrete substantially spherical organic polymer domains having a longest linear dimension of 30 nanometers to 300 nanometers that are disposed in porous oxide, wherein the porous oxide of the microparticle is selected from silicon oxide, titanium oxide, zirconium oxide, and combinations thereof.

2. The substantially spherical, porous oxide-organic polymer composite microparticle of claim 1, wherein the polymer shell has a thickness of 50 nanometers to 3 microns.

3. The substantially spherical, porous oxide-organic polymer composite microparticle of claim 1, wherein the organic polymer domains are polymethacrylate, poly(methyl methacrylate) (MMA), polystyrene, or poly(vinyl acetate).

4. A method for making a plurality of substantially spherical, oxide-organic polymer composite microparticles, the composite microparticles having a longest linear dimension of 1 micron to 2 millimeters and having a plurality of discrete substantially spherical domains of organic polymer having a longest linear dimension of 30 nanometers to 300 nanometers disposed in an oxide selected from silicon oxide, titanium oxide, zirconium oxide, and combinations thereof and an organic polymer shell comprising the steps of:
 a) contacting an organic polymer precursor, an alkoxy oxide precursor, a chemical initiator, a steric stabilizer, organic solvent, and water to form a reaction mixture comprising a suspension of organic solvent droplets;
 b) holding the reaction mixture for a time and temperature such that microparticles comprising a plurality of substantially spherical organic polymer nanoparticles and organic polymer shell are formed, wherein the alkoxy oxide precursor is in the microparticles and is substantially unreacted;
 c) optionally, contacting the microparticles from b) with additional alkoxy precursor; and
 d) contacting the microparticles from b) or c) with an acid catalyst such that the oxide is formed by hydrolysis of the alkoxy oxide precursor resulting in formation of the substantially spherical, oxide-organic polymer composite microparticles.

5. The method of claim 4, further comprising the steps of:
 e) removing substantially all of the organic polymer; and
 f) optionally, contacting the microparticles from e) with a catalyst and, optionally, a co-catalyst, such that at least a portion of a surface of the microparticles is functionalized with the catalyst.

6. The method of claim 5, wherein the organic polymer is removed by calcination, dissolution, or pyrolysis.

7. The method of claim 5, wherein the catalyst of step (f) is an olefin polymerization catalyst.

8. The method of claim 7, wherein the olefin polymerization catalyst is a metallocene catalyst and the co-catalyst is an aluminum alkyl compound.

9. The method of claim 4, wherein the alkoxy oxide precursor is selected from silicon alkoxides, titanium alkoxides, zirconium alkoxides, and combinations thereof.

10. The method of claim 4, wherein the organic polymer precursor is an organic vinyl monomer.

11. The method of claim 4, wherein the steric stabilizer is selected from polydimethy siloxane (PDMS), methacryloxypropyl terminated PDMS, poly(vinyl pyrolidone), poly(12-hydroxy-stearic acid), polystyrene-block(polyethylene-co-polypropylene), sorbitane monooleate, and combinations thereof.

* * * * *